US011820945B2

(12) United States Patent
Gupta et al.

(10) Patent No.: US 11,820,945 B2
(45) Date of Patent: Nov. 21, 2023

(54) MECHANICALLY RESILIENT BITUMEN MICROCAPSULES FOR MIDSTREAM TRANSPORT

(71) Applicant: Cenovus Energy Inc., Calgary (CA)

(72) Inventors: Subodh Gupta, Calgary (CA); Anita, College Station, TX (US); Sarbajit Banerjee, College Station, TX (US); Wasif Zaheer, College Station, TX (US)

(*) Notice: Subject to any disclaimer, the term of this patent is extended or adjusted under 35 U.S.C. 154(b) by 0 days.

(21) Appl. No.: 17/518,398

(22) Filed: Nov. 3, 2021

(65) Prior Publication Data

US 2022/0135885 A1    May 5, 2022

Related U.S. Application Data

(60) Provisional application No. 63/109,262, filed on Nov. 3, 2020.

(51) Int. Cl.
 *C10C 3/16* (2006.01)
 *C10G 1/00* (2006.01)
 *C08L 95/00* (2006.01)

(52) U.S. Cl.
 CPC .............. *C10C 3/16* (2013.01); *C08L 95/00* (2013.01); *C10G 1/00* (2013.01); *C10G 2300/4075* (2013.01)

(58) Field of Classification Search
 CPC ......... B01J 13/04; B01J 13/206; C08L 95/00; C10C 3/14; C10C 3/16; C10G 1/00; C10G 2300/4075; H01L 28/84
 See application file for complete search history.

(56) References Cited

U.S. PATENT DOCUMENTS 2,814,240 A   11/1957  Kuchler et al.
3,380,732 A    4/1968  Simpson
(Continued)

OTHER PUBLICATIONS

"UOP/AMEC Foster Wheeler Solvent Deasphalting Process.", Meyers, Robert A., ed. 2016. Chap. 9.2 in Handbook of Petroleum Refining Processes. 4th ed. New York: McGraw-Hill Education. https://www.accessengineeringlibrary.com/content/book/9780071850490/chapter/chapter39.
(Continued)

*Primary Examiner* — Ellen M McAvoy
*Assistant Examiner* — Chantel Graham
(74) *Attorney, Agent, or Firm* — GORDON & JACOBSON, P.C.

(57) ABSTRACT

Disclosed herein are methods of preparing bitumen for transport, apparatus for preparing bitumen for transport, methods of transporting bitumen, and transportation-ready forms of bitumen. Instead of relying on exogenous components to induce bitumen solidification, the methods and apparatus of the present disclosure reorganize bituminous materials derived from the same origin into core-shell bitumen microcapsules, such that relatively low solubility components (e.g. asphaltenes) encapsulate relatively high solubility components (e.g. maltenes). Importantly, the bitumen microcapsules of the present disclosure are sufficiently mechanically resilient to meet one or more thresholds for midstream transportation, and they are readily fluidized for downstream processing with conventional technologies. Taken together, these aspects may ameliorate one or more challenges in achieving commercially viable bitumen solidification technologies.

13 Claims, 12 Drawing Sheets

(56) References Cited

U.S. PATENT DOCUMENTS

2011/0094937 A1    4/2011  Subramanian et al.
2019/0240124 A1*  8/2019  Dardelle ................. B01J 13/16
2021/0139785 A1*  5/2021  Gates ....................... C10C 3/14

OTHER PUBLICATIONS

AM-94-25 Hyvahl-Solvahl—Key Processes For Upgrading of Residues, Morrison, M.E et al., NPRA Meeting, Mar. 20-22, 1994 Meeting.

\* cited by examiner

MECHANICALLY RESILIENT BITUMEN MICROCAPSULES FOR MIDSTREAM TRANSPORT

CROSS-REFERENCE TO RELATED APPLICATION

This application claims priority to and benefit of U.S. Provisional Patent Application Ser. No. 63/109,262 filed on Nov. 3, 2020, which is hereby incorporated by reference in its entirety.

TECHNICAL FIELD

The present disclosure generally relates to methods of preparing bitumen for transport, apparatus for preparing bitumen for transport, methods of transporting bitumen, and to transportation-ready forms of bitumen.

BACKGROUND

Relatively easy access to conventional hydrocarbon resources has played a pivotal role in spurring global economic growth over the last century. However, these resources are rapidly depleting. As such, there is considerable interest and investment in technologies relating to the discovery, extraction, and refinement of unconventional sources of hydrocarbon fuels, such as bitumen. Bitumen is a highly viscous form of petroleum, which is produced at commercial scale from oil sand reserves in Canada, Venezuela, and other countries. The unfavorable rheological properties of bitumen pose a distinctive set of challenges during extraction, transportation, and processing. Midstream transportation—for example from wellhead to geographically distant refineries—is particularly challenging with bituminous material. Conventional approaches facilitate midstream bitumen transport in fluid form by, for example, employing extensive thermal jacketing infrastructure around pipelines and/or containers. This type of infrastructure is often expensive, complicated to maintain, and/or prone to failure. Fluid-form bitumen transport also typically requires the addition of large volumes of diluent (primarily low molecular-weight hydrocarbons) to meet transportation specifications with respect to flowability. This is problematic in that transporting large volumes of diluent is inherently inefficient, particularly in the context of volume-constrained pipeline infrastructure.

Solid-phase bitumen transportation strategies have the potential to mitigate at least some of the foregoing inefficiencies. As such, recent attention has focused on the development of technologies for solidifying bitumen for midstream transport by road, rail, marine tankers, and/or shipping containers. Such technologies typically rely on exogenous components, such as plastics and/or polymerization agents, to induce bitumen solidification. Unfortunately, the extent to which such technologies are commercially viable is not clear. Relying on exogenous components is likely to be cost and/or material prohibitive at commercial scale. For example, to transport about 3.8M barrels of oil per day, even at a conservative mass loading of about 10 wt. %, one would require about 55,000 tons of the additive to enable encapsulation and solidification. Accordingly, there is an unmet need for technologies/strategies that induce bitumen solidification without relying on exogenous components.

SUMMARY

Bitumen is a mixture of innumerable structurally-distinct components that have neither discrete nor homologous composition, which makes it difficult to characterize and classify with particularity. One widely accepted convention, following precedents set in early compositional investigations, divides bitumen into two main constituents by general solubility characteristics: maltenes and asphaltenes.

Maltenes are compositions of relatively low molecular weight compounds comprised of aromatic and heteroaromatic rings, saturated alkyl chains, and/or paraffinic resins. The resultant mixture of these types of compounds is soluble in both aromatic and aliphatic solvents. Maltenes are relatively amenable to conventional midstream transportation due, at least in part, to this favourable solubility.

In contrast, asphaltenes are compositions of relatively high molecular weight alkylated polycyclic aromatic compounds with relatively high concentrations of heteroatoms and/or trace metals. Asphaltenes often contain the same chemical functionalities as maltenes but in larger, interconnected frameworks, which are generally believed to be held together by both covalent bonds and noncovalent associations. Given the highly variable nature of asphaltenes, many factors contribute to these associations, such as aromatic $\pi$-$\pi$ stacking, acid-base, hydrogen bonding, and/or van der Waals interactions. Due at least in part to these cohesive intermolecular interactions, asphaltenes are not soluble in aliphatic solvents (such as hexane), and they tend to aggregate, precipitate, and/or flocculate from fluid mixtures. This is highly problematic for midstream transport operations. For example, deposition of solid asphaltenes within pipelines increases downtime, decreases throughput, and increases costs on already high cap-ex infrastructure whilst also posing a safety hazard as a result of pressure buildup that can potentially compromise the integrity of pipelines.

The present disclosure reframes asphaltene aggregation/precipitation not as a nuisance but as an opportunity for addressing one or more of the foregoing unmet needs with respect to bitumen solidification technologies. The present disclosure utilizes the natural tendency for asphaltenes to self-associate (e.g., by crosslinking) as a means for converting bitumen from its native viscoelastic state into a solid form that is amenable to midstream transportation. The methods of the present disclosure rearrange the natural components of bitumen into core-shell microcapsules where the relatively soluble components (e.g., maltenes) are encapsulated by the less soluble components (e.g., asphaltenes).

Importantly, the methods of the present disclosure do not rely on exogenous components to facilitate the solidification process. Moreover, select methods of the present disclosure provide microcapsules that are sufficiently mechanically resilient to meet one or more thresholds for midstream transportation. Further, select methods of the present disclosure provide microcapsules that are readily fluidized, which may facilitate processing with conventional technologies following midstream transportation. Taken together, these aspects may ameliorate one or more challenges in achieving commercially viable bitumen solidification technologies.

Select embodiments of the present disclosure relate to an asphaltene-coated bitumen microcapsule, comprising:
 a microcapsule core comprising bitumen, deasphalted oil, or a combination thereof; and
 a microcapsule shell comprising asphaltenes;
 wherein the microcapsule core and the microcapsule shell are substantially derived from the same origin, and wherein the asphaltenes, the bitumen, the deasphalted oil, or the combination thereof is cured such that the asphaltene-coated bitumen microcapsule is sufficiently mechanically resilient to surpass a threshold for transportation.

Select embodiments of the present disclosure relate to a unit of microencapsulated bitumen, comprising:
a plurality of asphaltene-coated bitumen microcapsules comprising a plurality of microcapsule cores and a plurality of microcapsule shells, wherein: (i) the microcapsule cores comprise bitumen, deasphalted oil, or a combination thereof; (ii) the microcapsule shells comprises asphaltenes; (iii) the microcapsule cores and the microcapsule shells are substantially derived from the same origin; and (iv) the asphaltenes, the bitumen, the deasphalted oil, or the combination thereof is cured such that the asphaltene-coated bitumen microcapsules are, on average, sufficiently mechanically resilient to surpass a threshold for transportation.

Select embodiments of the present disclosure relate to a method for transporting bitumen, the method comprising:
generating a plurality of asphaltene-coated bitumen microcapsules comprising a plurality of microcapsule cores and a plurality of microcapsule shells, wherein: (i) the microcapsule cores comprise bitumen, deasphalted oil, or a combination thereof, (ii) the microcapsule shells comprises asphaltenes, and (iii) the microcapsule cores and the microcapsule shells are substantially derived from the same origin;
curing the asphaltenes, the bitumen, the deasphalted oil, or the combination thereof such that the asphaltene-coated bitumen microcapsules are, on average, sufficiently mechanically resilient to surpass a threshold for transportation; and
transporting the plurality of asphaltene-coated bitumen microcapsules in a transportation vessel and under conditions that specify the threshold for transportation.

Select embodiments of the present disclosure relate to a method for generating a plurality of asphaltene-coated bitumen microcapsules, the method comprising:
(i) generating a plurality of concentric streams comprising a distal stream and a proximal stream, wherein the distal stream comprises asphaltenes, and wherein the proximal stream comprises bitumen, deasphalted oil, or a combination thereof;
(ii) modulating the proximal stream to form a plurality of microcapsule cores comprising the bitumen, the deasphalted oil, or the combination thereof;
(iii) modulating the distal stream to form a plurality of microcapsule shells comprising the asphaltenes, wherein (i), (ii), and (iii) are executed such that the plurality of microcapsule shells substantially encapsulate the plurality of microcapsule cores to form a plurality of nascent asphaltene-coated bitumen microcapsules; and
(iv) curing the asphaltenes, the bitumen, the deasphalted oil, or the combination thereof, such that the plurality of nascent asphaltene-coated bitumen microcapsules harden into a plurality of asphaltene-coated bitumen microcapsules that are, on average, sufficiently mechanically resilient to surpass a threshold for transportation.

Select embodiments of the present disclosure relate to an apparatus for generating a plurality of asphaltene-coated bitumen microcapsules, the apparatus comprising:
a discharging element comprising a plurality of concentric outlets, the plurality of concentric outlets comprising:
a proximal outlet for discharging a proximal stream comprising bitumen, deasphalted oil, or a combination thereof, from the discharging element, and
a distal outlet for discharging a distal stream, comprising asphaltenes, from the discharging element;
a plurality of controls for modulating the proximal stream, the distal stream, or a combination thereof to form: (i) a plurality of microcapsule cores comprising the bitumen, the deasphalted oil, or the combination thereof, (ii) a plurality of microcapsule shells comprising the asphaltenes, and (iii) the plurality of microcapsule cores and the plurality of microcapsule shells into a plurality of nascent asphaltene-coated bitumen microcapsules; and
a vessel for receiving at least a portion of the plurality of nascent asphaltene-coated bitumen microcapsules and curing the asphaltenes, the bitumen, the deasphalted oil, or the combination thereof, such that the plurality of nascent asphaltene-coated bitumen microcapsules harden into a plurality of asphaltene-coated bitumen microcapsules that are, on average, sufficiently mechanically resilient to surpass a threshold for transportation.

Select embodiments of the present disclosure relate to a method for generating a plurality of asphaltene-coated bitumen microcapsules, the method comprising:
dispersing a plurality of droplets comprising bitumen, deasphalted oil, or a combination thereof into a plurality of particles comprising asphaltenes such that: (i) the bitumen, the deasphalted oil, or the combination thereof form a plurality of microcapsule cores, (ii) the asphaltenes form a plurality of microcapsule shells, and (iii) the plurality of microcapsule shells substantially encapsulate the plurality of microcapsule cores to form a plurality of nascent asphaltene-coated bitumen microcapsules; and
curing the asphaltenes, the bitumen, the deasphalted oil, or the combination thereof such that the plurality of nascent asphaltene-coated bitumen microcapsules harden into a plurality of asphaltene-coated bitumen microcapsules that are, on average, sufficiently mechanically resilient to surpass a threshold for transportation.

Select embodiments of the present disclosure relate to an apparatus for generating a plurality of asphaltene-coated bitumen microcapsules, the apparatus comprising:
a discharging element and a receiving vessel, wherein the discharging element is configured to disperse a plurality of droplets comprising bitumen, deasphalted oil, or a combination thereof into the receiving vessel, and the receiving vessel is configured receive the plurality of droplets in a plurality of particles comprising asphaltenes such that: (i) the bitumen, the deasphalted oil, or the combination thereof form a plurality of microcapsule cores, (ii) the asphaltenes form a plurality of microcapsule shells, and (iii) the plurality of microcapsule shells substantially encapsulate the plurality of microcapsule cores to form a plurality of nascent asphaltene-coated bitumen microcapsules; and
a curing vessel for curing the asphaltenes, the bitumen, the deasphalted oil, or the combination thereof, such that the plurality of nascent asphaltene-coated bitumen microcapsules harden into a plurality of asphaltene-coated bitumen microcapsules that are, on average, sufficiently mechanically resilient to surpass a threshold for transportation.

Other aspects and features of the methods of the present disclosure will become apparent to those ordinarily skilled in the art upon review of the following description of specific embodiments.

BRIEF DESCRIPTION OF THE DRAWINGS

These and other features of the present disclosure will become more apparent in the following detailed description in which reference is made to the appended drawings. The appended drawings illustrate one or more embodiments of the present disclosure by way of example only and are not to be construed as limiting the scope of the present disclosure.

DETAILED DESCRIPTION

Figure 1:
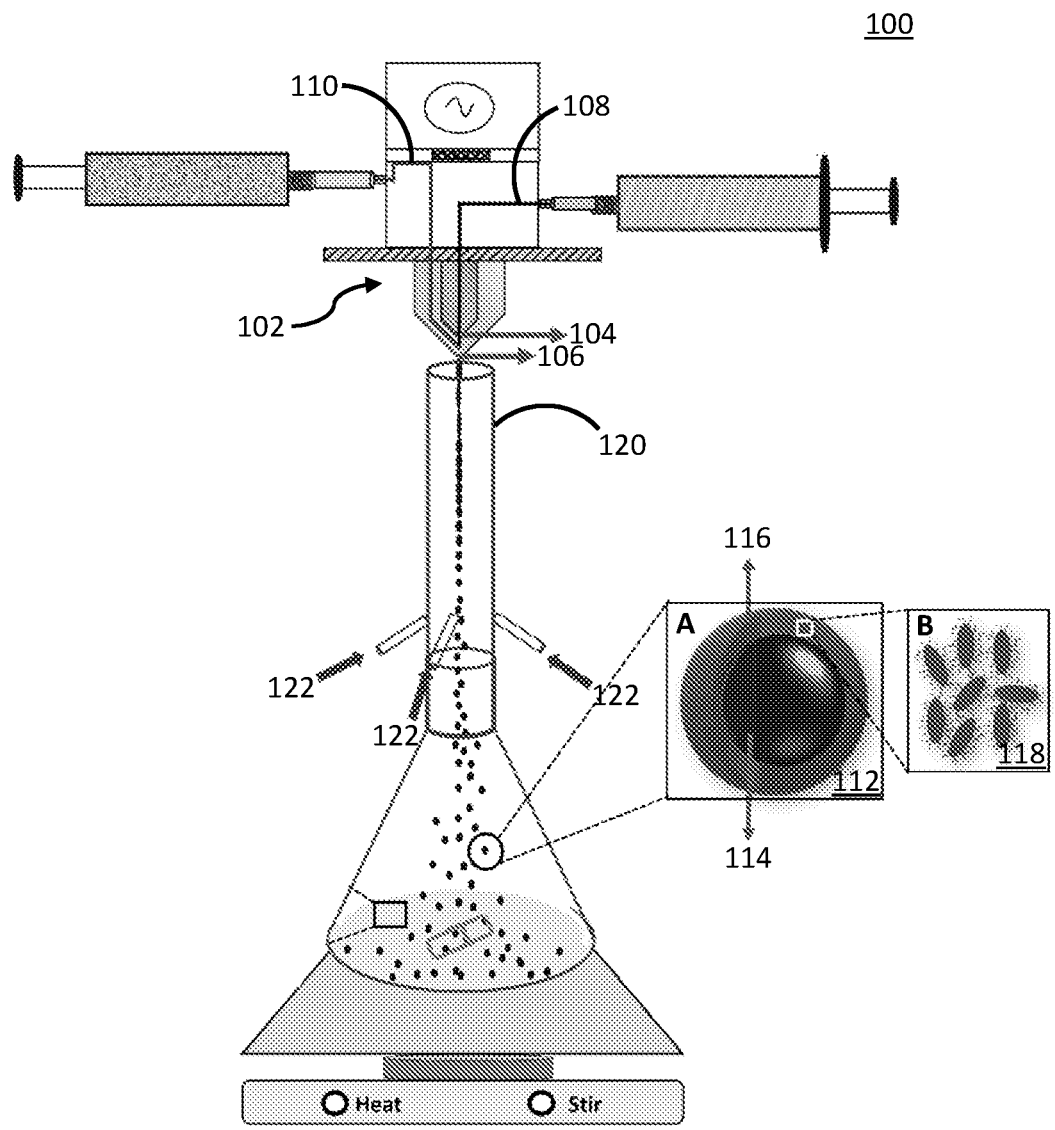
FIG. 1 shows a schematic of an apparatus featuring a concentric-nozzle setup for generating asphaltene-coated bitumen microcapsules in accordance with the present disclosure.

Embodiments of the present disclosure will now be described by reference to FIG. 1 to FIG. 12.

As noted above, improving the efficiency of midstream transportation is a recalcitrant challenge for bituminous materials given their unfavorable rheological properties. Fortunately, bitumen solidification technologies have the potential to introduce considerable efficiencies in this space, for example, by obviating the need for expensive diluents and/or specialized infrastructure. However, viable solutions are likely to require at least three elements that are not well represented in the art: (i) a solidification mechanism that does not rely on exogenous components, such that additives are optional instead of required; (ii) a solidification mechanism that is substantially reversible, such that post-transport materials can be readily fluidized and incorporated into conventional downstream technologies with little or no modification; and (iii) a solidification mechanism that imbues sufficient mechanical resiliency, such that the resulting materials meet one or more thresholds for midstream transportation. The present disclosure reports extensive research and development that elucidates how microencapsulation can be utilized toward these ends.

Microencapsulation involves the application of one or more protective coatings (sometimes referred to as a shell) around an active material (sometimes referred to as a core or a payload) to provide a discrete form that falls within a size range of about 0.2 μm to about 5,000 μm. Microcapsule cores may be solid, liquid, and/or gas, whereas microcapsule shells typically comprise a solid material that is cross-linked upon application. Microcapsules may be fluidized (e.g., to release their payloads) in response to a mechanical stress that induces rupture of the shell or a stimulus that induces de-polymerization or dissolution of the shell.

The results reported herein demonstrate that microencapsulation can be utilized to form bitumen into solid microcapsules that are readily fluidized by heat and/or pressure and yet mechanically resilient enough to meet one or more thresholds for midstream transportation under standard temperature and pressure conditions. Importantly, the results reported herein further demonstrate that exogenous components are not required to do so.

The present disclosure reports the production of asphaltene-coated bitumen microcapsules by a variety of methods and using a variety of apparatus. A key teaching derived from the results set out herein is that the methods and/or apparatus of the present disclosure can be modulated to tune the physical parameters of the resultant asphaltene-coated bitumen microcapsules and that this provides a lever for balancing facile fluidization against mechanical resiliency. For example, the present disclosure sets out two categories of microencapsulation processes, each of which can be used to form asphaltene-coated bitumen microcapsules with control of the following parameters:

microcapsule-core radius ($r_{core}$);
microcapsule-shell thickness ($t_{shell}$);
microcapsule radius ($r_{microcapsule}$);
core-shell ratio ($r_{core}$:$t_{shell}$);
core-microcapsule ratio ($r_{core}$:$r_{microcapsule}$); and
shell-microcapsule ratio ($t_{shell}$:$r_{microcapsule}$), and these parameters can be selected to ensure the asphaltene-coated bitumen microcapsules surpass thresholds for midstream transportation.

One of the categories of microencapsulation approaches detailed in the present disclosure utilizes an actuated dual-flow nozzle to achieve core-shell encapsulation from concentric flows of bitumen and asphaltenes. The other utilizes a single bitumen stream that is dispersed into a bed of particulate asphaltenes to achieve core-shell encapsulation. The results of the present disclosure evidence that each approach is capable of providing asphaltene-coated bitumen microcapsules having the physical parameters required to surpass key thresholds for midstream transportation. However, aspects of the two categories of microencapsulation processes may also be combined to provide beneficial effects.

Compositions and Methods of Transport

Select embodiments of the present disclosure relate to an asphaltene-coated bitumen microcapsule, comprising:
a microcapsule core comprising bitumen, deasphalted oil, or a combination thereof; and
a microcapsule shell comprising asphaltenes;
wherein the microcapsule core and the microcapsule shell are substantially derived from the same origin, and wherein the asphaltenes, the bitumen, the deasphalted oil, or the combination thereof is cured such that the asphaltene-coated bitumen microcapsule is sufficiently mechanically resilient to surpass a threshold for transportation.

In the context of the present disclosure, the phrase "derived from the same origin" may refer to asphaltenes and bitumen, deasphalted oil, a combination thereof that were produced by the same hydrocarbon recovery operation and then separated during processing. Typical processes may involve mixing whole bitumen with a solvent (such as heptanes) to separate the soluble fraction (i.e. deasphalted oil, which may generally comprise maltenes) from the insoluble part (i.e. asphaltenes). Methods and apparatuses for separating asphaltenes from bitumen, deasphalted oil, or a combination thereof are known to those skilled in the art. Several such methods and apparatus are described in public literature, including but not limited to: (i) UOP's solvent deasphalting process (U.S. Pat. No. 3,830,732); (ii) KBR's ROSE process (US patent application publication No. 2011/0094937A1); (iii) IFP's Solvahl process (Billon, A., Morel, F., Morrison, M. E., Peries, J. P., 1994. Converting residues with IFP's hyvahl and solvahl processes. Rev. Inst. Fr. duPet. 49 (05), 495-507); and (iv) Foster Wheeler's SDA process (http://www.fwc.com/What-We-Do/Refining/FW-Residue40Upgrading-Technologies/Solvent-Deasphalting.aspx). Each of these references is herein incorporated by reference in their entirety.

In the context of the present disclosure, a microcapsule core and a microcapsule shell are substantially derived from the same origin even if the microcapsule core, the microcapsule shell, or a combination thereof includes an additive. For example, in select embodiments of the present disclosure, the microcapsule core, the microcapsule shell, or a combination thereof may include chloroform, carbon disulfide, dichloromethane, 1-chloropentane, tetrahydrofuran, toluene, p-xylenes, carbon tetrachloride, tetrachloroethylene (PCE), cyclohexane, cyclopentane, or a combination thereof. In select embodiments, the microcapsule shell may comprise chloroform, which may facilitate flow of the asphaltenes through the distal outlet. Importantly, the additive is optional and not required to induce bitumen solidification in the context of the present disclosure. This may represent an important aspect of the present disclosure, as exogeneous components may complicate refinery and/or upgrader operations, which may impact economic viability. In select embodiments of the present disclosure, additives such as those described in Canadian Patent No. 2,814,240, herein incorporated by reference in its entirety, may be employed. By way of example, additives may include inert materials such as poly(methylmethacrylate), coker fines, sulfur, clay, silica, or mixtures thereof, such as those described in Canadian Patent No. 2,814,240. A suitable additive for the microcapsule shell may include, for example, a material in which bitumen is not soluble. In select embodiments of the present disclosure, a suitable additive may comprise petroleum coke, coal, or coal powder.

In select embodiments of the present disclosure, the asphaltenes of the microcapsule shell may comprise continental asphaltenes, archipelago asphaltenes, or a combination thereof. In the context of the present disclosure, the term "continental" will be understood by those skilled in the art to indicate or include asphaltenes with, e.g., fused cyclic structures and few branches. These asphaltenes may tend not to dissolve even in toluene, partly because they agglomerate or form an emulsion. In the context of the present disclosure, the term "archipelago" will be understood by those of skill in the art to indicate asphaltenes that are easier to break down as compared to continental asphaltenes, and having, e.g., fewer fused rings and more branches. In select embodiments of the present disclosure, the asphaltenes are derived from treatment of whole bitumen with n-pentane or n-heptane. In select embodiments of the present disclosure the asphaltenes may be at least partially soluble in solvents that have solubility parameters ranging from 17-19 $MPa^{1/2}$ (e.g., xylene, chloroform, tetrahydrofuran, toluene, and/or carbon tetrachloride).

In select embodiments of the present disclosure, the bitumen and/or the deasphalted oil of the microcapsule core may comprise compositions of relatively low molecular weight compounds comprised of aromatic and heteroaromatic rings, saturated alkyl chains, and/or paraffinic resins. The resultant mixture of these types of compounds may be soluble in both aromatic and aliphatic solvents. For example, the bitumen and/or the deasphalted oil may be soluble in aromatic solvents such as toluene, benzene, xylene and aliphatic solvents such as hexanes and heptanes. Those skilled in the art who have benefitted from the teachings of the present disclosure will appreciate that such aromatic and aliphatic solvents are available in a variety of purities and may comprise relatively small quantities of other components. For example, a $C_5$-$C_7$ hydrocarbon may comprise other hydrocarbons, water, alcohol, or combinations thereof. Likewise, commercially available diluents may be considered $C_5$-$C_7$ hydrocarbons in that they primarily comprise mixtures of pentane, hexane, and heptane in their various isomeric forms (e.g. cyclopentane, iso-pentane, n-pentane).

In the context of the present disclosure, the terms "cured" and "curing" are used to refer to the process of aging asphaltene-coated bitumen microcapsules under a particular set of conditions. In other words, during curing, one or more variables (such as temperature, pH, pressure, ambient environment, agitation rate, solvent content, irradiation wavelength, etc.) may be selected and/or modulated over time to control the physical properties of the asphaltene-coated bitumen microcapsules. In the context of the present disclosure, curing may involve covalent and/or non-covalent modes of agglomeration/aggregation. Without being bound to any particular theory, the present disclosure posits that curing may be associated with asphaltene crosslinking, and that the presence of heteroatoms and/or polyaromatic hydrocarbons in the asphaltenes structure may allow intermolecular interactions (such as formation of coordination complexes, chelating metal structures, π-π stacking, acid-base pairs, Vander Waal interactions, dipole-dipole interactions, and H-bonding) that can lead to formation of aggregates and clusters. With increasing time, the asphaltenes may adopt conformations that allow for increased intermolecular interactions.

In the context of the present disclosure, the phrase "sufficiently mechanically resilient to surpass a threshold for transportation" refers to mechanical properties associated with midstream transportation. Velocity-impact resiliency and compression-stress resiliency are two non-limiting examples of mechanical resiliency in the context of midstream transportation. In select embodiments of the present disclosure, for viability at scale, the microcapsules may be required to withstand being dropped into a container from a height of about 30 m, which corresponds to a terminal velocity of about 24 m/s. As such, this metric represents a potential minimum strength required for the microcapsules for handling and transportation in 30 m high containers. The ability of the microcapsules to maintain their integrity upon drop impact is evaluated sung velocity-impact resiliency tests. Compression-stress resiliency measurements provide a measure of forces that can be sustained before rupture and provide a means of evaluating the robustness of the microcapsules during regular operations and handling. This test further provides a measure of the force required to release and recover the payload.

In select embodiments of the present disclosure, the asphaltene-coated bitumen microcapsule may have a velocity-impact resiliency of at least about: (i) 10 m/s, (ii) 15 m/s, or (iii) 20 m/s, when evaluated on impact with an aluminum surface. In select embodiments of the present disclosure, the asphaltene-coated bitumen microcapsule may have a velocity-impact resiliency of at least about: (i) 10 m/s, (ii) 20 m/s, or (iii) 30 m/s, when evaluated on impact with a cardboard surface.

In select embodiments of the present disclosure, the asphaltene-coated bitumen microcapsule may have a compression-stress resiliency of at least about: (i) 50 kN/m$^2$, (ii) 200 kN/m$^2$, or (iii) 500 kN/m$^2$.

Without being bound to any particular theory, the present disclosure posits that the mechanical resiliency of the asphaltene-coated bitumen microcapsules may be correlated to one or more of the following variables: microcapsule-core radius ($r_{core}$); microcapsule-shell thickness ($t_{shell}$) microcapsule radius ($r_{microcapsule}$); core-shell ratio ($r_{core}$:$t_{shell}$); core-microcapsule ratio ($r_{core}$:$r_{microcapsule}$); and shell-microcapsule ratio ($t_{shell}$:$r_{microcapsule}$).

In select embodiments of the present disclosure, the asphaltene-coated bitumen microcapsule may have a radius ($r_{microcapsule}$) of: (i) between about 0.5 mm and about 1.0 mm; (ii) between about 1.0 mm and about 2.0 mm; or (iii) between about 2.0 mm and about 3.0 mm. Those skilled in the art who have benefited from the teachings of the present disclosure will appreciate suitable instruments and/or methods for determining $r_{microcapsule}$ for a particular asphaltene-coated bitumen microcapsule. For example, laser scattering particle size analyzer, confocal microscopy, vernier caliper, scanning electron microscopy, optical microscopy, and/or a combination thereof.

In select embodiments of the present disclosure, the microcapsule core may have a microcapsule-core radius ($r_{core}$) of: (i) between about 100 μm and about 500 μm; (ii) between about 500 μm and about 1,000 μm; or (iii) between about 1,000 μm and about 1,500 μm. Those skilled in the art who have benefited from the teachings of the present disclosure will appreciate suitable instruments and/or methods for determining $r_{core}$ for a particular asphaltene-coated bitumen microcapsule. For example, images from cross-sectional confocal microscopy or cross-sectional scanning electron microscopy may be used to measure the $r_{core}$ for a particular asphaltene-coated bitumen microcapsule.

In select embodiments of the present disclosure, the microcapsule shell may have a microcapsule-shell thickness ($t_{shell}$) of: (i) between about 10 μm and about 100 μm; (ii) between about 100 μm and about 200 μm; or (iii) between about 200 μm and about 300 μm. Those skilled in the art who have benefited from the teachings of the present disclosure will appreciate suitable instruments and/or methods for determining $t_{shell}$ for a particular asphaltene-coated bitumen microcapsule. For example, images from cross-sectional confocal microscopy may be used to measure the $t_{shell}$ for a particular asphaltene-coated bitumen microcapsule.

In select embodiments of the present disclosure, the asphaltene-coated bitumen microcapsule may have a core-shell ratio ($r_{core}$:$t_{shell}$) of: (i) between about 4.0:1.0 and about 3.0:1.0; (ii) between about 3.0:1.0 and about 2.0:1.0; or (iii) between about 2.0:1.0 and about 1.0:1.0. Those skilled in the art who have benefited from the teachings of the present disclosure will appreciate suitable instruments and/or methods for determining $r_{core}$:$t_{shell}$ having regard to, for example, the instruments and/or methods identified with respect to $r_{core}$ and $t_{shell}$ individually.

In select embodiments of the present disclosure, the asphaltene-coated bitumen microcapsule may have a core-microcapsule ratio ($r_{core}$:$r_{microcapsule}$) of: (i) between about 1.0:2.0 and about 1.0:1.6; (ii) between about 1.0:1.6 and about 1.0:1.3; or (iii) between about 1.0:1.3 and about 1.0:1.1. Those skilled in the art who have benefited from the teachings of the present disclosure will appreciate suitable instruments and/or methods for determining $r_{core}$: $r_{microcapsule}$ having regard to, for example, the instruments and/or methods identified with respect to $r_{core}$ and $r_{microcapsule}$ individually.

In select embodiments of the present disclosure, the asphaltene-coated bitumen microcapsule may have a shell-microcapsule ratio ($t_{shell}$:$r_{microcapsule}$) of: (i) between about 1.0:10.0 and about 1.0:7.0; (ii) between about 1.0:7.0 and about 1.0:4.0; or (iii) between about 1.0:4.0 and about 1.0:2.0. Those skilled in the art who have benefited from the teachings of the present disclosure will appreciate suitable instruments and/or methods for determining $t_{shell}$: $r_{microcapsule}$ having regard to, for example, the instruments and/or methods identified with respect to $t_{shell}$ and $r_{microcapsule}$ individually.

In the context of the present disclosure, the weight ratio of asphaltenes to bitumen, deasphalted oil, or a combination thereof in a single asphaltene-coated bitumen microcapsule may be approximated by the following equation:

$$\frac{m_a}{m_b} = \frac{(r_{microcapsule}^3 - r_{core}^3)\rho_a}{r_{core}^3 \rho_b} \qquad \text{Eqn. 1}$$

wherein:

$$\frac{m_a}{m_b}$$

is the mass ratio of asphaltenes to bitumen, deasphalted oil, or a combination thereof;
$\rho_a$ is the density of the asphaltenes;
$\rho_b$ is the density of the bitumen, the deasphalted oil, or the combination thereof;
$r_{core}$ is the microcapsule-core radius; and
$r_{microcapsule}$ is the microcapsule radius.

In select embodiments of the present disclosure, the asphaltene-coated bitumen microcapsule may have a weight ratio $$\left(\frac{m_a}{m_b}\right)$$

of: (i) between about 1.0:1.0 and about 1.0:1.4; (ii) between about 1.0:1.4 and about 1.0:1.8; or (iii) between about 1.0:1.8 and about 1.0:2.2, wherein ratio $$\left(\frac{m_a}{m_b}\right)$$

is the mass ratio of the asphaltenes to the bitumen, the deasphalted oil, or the combination thereof.

The results of the present disclosure suggest that the proportion of the microcapsule constituted from asphaltenes increases with decreasing diameter of the microcapsules. For instance, microcapsules with a diameter of 1.81±0.24 mm have about 0.20±0.03 mm shells and the asphaltenes mass fraction is estimated to be about 42%. In contrast, microcapsules with a diameter of 1.67±0.21 mm have about 0.18±0.06 mm shells and the asphaltenes mass fraction is estimated to be about 46%. In select embodiments of the present disclosure, the stress-withstanding ability may be inversely proportional to microcapsule size. Since smaller microcapsules may have a greater proportion of the shell material and a smaller viscoelastic core, the stress-withstanding ability of the microcapsules may increase with a decrease in the size. For instance, for about 2 mm diameter microcapsules, the stress-withstanding ability may be about 210 kN/m² after a period of 3 days, whereas for about 1.09 mm microcapsules, this metric may be about 533 kN/m².

In select embodiments of the present disclosure, the asphaltenes are derived from treatment of whole bitumen with n-pentane or n-heptane. In select embodiments of the present disclosure, the asphaltenes may be at least partially soluble in solvents that have solubility parameters ranging from 17-19 MPa$^{1/2}$.

In the context of the present disclosure, a plurality of asphaltene-coated bitumen microcapsules may be considered as a larger "unit" having characteristics expressed as distribution curves of the characteristics of the individual asphaltene-coated bitumen microcapsules populating the unit. Accordingly, many of the definitions, teachings, embodiments, examples, etc. set out herein with respect to a single asphaltene-coated bitumen microcapsule may apply equally to a unit of asphaltene-coated bitumen microcapsules and vice versa. In the context of the present disclosure, a "unit" of microencapsulated bitumen may be a transportation quantity such as a barrel, a rail car, a shipping container, or the like.

Select embodiments of the present disclosure relate to a unit of microencapsulated bitumen, comprising:
 a plurality of asphaltene-coated bitumen microcapsules comprising a plurality of microcapsule cores and a plurality of microcapsule shells, wherein: (i) the microcapsule cores comprise bitumen, deasphalted oil, or a combination thereof; (ii) the microcapsule shells comprises asphaltenes; (iii) the microcapsule cores and the microcapsule shells are substantially derived from the same origin; and (iv) the asphaltenes, the bitumen, the deasphalted oil, or the combination thereof is cured such that the asphaltene-coated bitumen microcapsules are, on average, sufficiently mechanically resilient to surpass a threshold for transportation.

In the context of the present disclosure, asphaltene-coated bitumen microcapsules are, on average, sufficiently mechanically resilient to surpass a threshold for transportation when at least 50% of the asphaltene-coated bitumen microcapsules surpass the threshold on a mass basis. In select embodiments of the present disclosure, at least 60%, at least 70%, at least 80%, or at least 90%, of the asphaltene-coated bitumen microcapsules surpass the threshold on a mass basis.

In select embodiments of the present disclosure, in the unit of microencapsulated bitumen, the plurality of asphaltene-coated bitumen microcapsules have an average microcapsule-core radius ($r_{core}$) of: (i) between about 100 μm and about 500 μm; (ii) between about 500 μm and about 1,000 μm; or (iii) between about 1,000 μm and about 1,500 μm.

In select embodiments of the present disclosure, in the unit of microencapsulated bitumen, the plurality of asphaltene-coated bitumen microcapsules have an average microcapsule-shell thickness ($t_{shell}$) of: (i) between about 10 μm and about 100 μm; (ii) between about 100 μm and about 200 μm; or (iii) between about 200 μm and about 300 μm.

In select embodiments of the present disclosure, in the unit of microencapsulated bitumen, the plurality of asphaltene-coated bitumen microcapsules have an average core-shell ratio ($r_{core}$:$t_{shell}$) of: (i) between about 4.0:1.0 and about 3.0:1.0; (ii) between about 3.0:1.0 and about 2.0:1.0; or (iii) between about 2.0:1.0 and about 1.0:1.0.

In select embodiments of the present disclosure, in the unit of microencapsulated bitumen, the plurality of asphaltene-coated bitumen microcapsules have an average core-microcapsule ratio ($r_{core}$:$r_{microcapsule}$) of: (i) between about 1.0:2.0 and about 1.0:1.6; (ii) between about 1.0:1.6 and about 1.0:1.3; or (iii) between about 1.0:1.3 and about 1.0:1.1.

In select embodiments of the present disclosure, in the unit of microencapsulated bitumen, the plurality of asphaltene-coated bitumen microcapsules have an average shell-microcapsule ratio ($t_{shell}$:$r_{microcapsule}$) of: (i) between about 1.0:10.0 and about 1.0:7.0; (ii) between about 1.0:7.0 and about 1.0:4.0; or (iii) between about 1.0:4.0 and about 1.0:2.0.

In select embodiments of the present disclosure, in the unit of microencapsulated bitumen, the plurality of asphaltene-coated bitumen microcapsules have an average weight ratio $$\left(\frac{m_a}{m_b}\right)$$

of: (i) between about 1.0:1.0 and about 1.0:1.4; (ii) between about 1.0:1.4 and about 1.0:1.8; or (iii) between about 1.0:1.8 and about 1.0:2.2, wherein $m_a$ is the mass of the asphaltenes and $m_b$ the mass of the bitumen, the deasphalted oil, or the combination thereof.

In select embodiments of the present disclosure, in the unit of microencapsulated bitumen, the plurality of asphaltene-coated bitumen microcapsules have an average velocity-impact resiliency of at least about: (i) 10 m/s; (ii) 15 m/s; or (iii) 20 m/s; when evaluated on impact with an aluminum surface.

In select embodiments of the present disclosure, in the unit of microencapsulated bitumen, the plurality of asphaltene-coated bitumen microcapsules have an average velocity-impact resiliency of at least about: (i) 10 m/s; (ii) 20 m/s; or (iii) 30 m/s; when evaluated on impact with a cardboard surface.

In select embodiments of the present disclosure, in the unit of microencapsulated bitumen, the plurality of asphaltene-coated bitumen microcapsules have an average compression-stress resiliency of at least about: (i) 50 kN/m$^2$, (ii) 200 kN/m$^2$, or (iii) 500 kN/m$^2$.

Select embodiments of the present disclosure relate to a method for transporting bitumen, the method comprising:
generating a plurality of asphaltene-coated bitumen microcapsules comprising a plurality of microcapsule cores and a plurality of microcapsule shells, wherein: (i) the microcapsule cores comprise bitumen, deasphalted oil, or a combination thereof, (ii) the microcapsule shells comprises asphaltenes, and (iii) the microcapsule cores and the microcapsule shells are substantially derived from the same origin;
curing the asphaltenes, the bitumen, the deasphalted oil, or the combination thereof such that the asphaltene-coated bitumen microcapsules are, on average, sufficiently mechanically resilient to surpass a threshold for transportation; and
transporting the plurality of asphaltene-coated bitumen microcapsules in a transportation vessel and under conditions that specify the threshold for transportation.

The composition of the asphaltene shell may dictate the temperature profile associated with transportation. For example, in select embodiments where the shell comprises continental asphaltenes, the temperature may be maintained below about 210° C. In select embodiments where the shell comprises archipelago asphaltenes, the temperature may be maintained below about 187° C.

In select embodiments of the present disclosure, the transportation vessel is a barrel, a rail car, a shipping container, or the like. In select embodiments of the present disclosure, a barrel or a shipping container of about 70 cm height can hold the solid microcapsules without any significant ruptures in the shells.

Following transport, the asphaltene-coated bitumen microcapsules may be fluidized directly for subsequent processing. Alternatively, the asphaltene shell may first be recovered and separated out. In cases where the shell is not harmful to downstream processes, or where the microcapsule shell is very thin or present in trace amounts and thus insignificant to the mass of the overall composition of the asphaltene-coated bitumen microcapsule, recovery of the shell may be unnecessary. In select embodiments of the present disclosure, the method of transportation further comprises fluidizing the plurality of asphaltene-coated bitumen microcapsules. Mechanically pressing the solid microcapsules at stresses higher than their withstanding abilities can rupture and fluidize the microcapsules. For example, stress greater than about 533 kN/m$^2$ for about 1.09 mm microcapsules may deform the core-shell formulation and fluidize the microcapsules. In select embodiments of the present disclosure, the fluidization can be performed either: (i) in the solid phase atop a membrane allowing fluids to permeate and be collected at the bottom of a receptacle while retaining solid asphaltenes, or (ii) in the liquid phase in the presence of diluents enabling separation of the fluidized deasphalted oil and recovery of the solid asphaltenes by sedimentation or precipitation.

In select embodiments of the present disclosure, the threshold for transportation may be a velocity-impact resiliency threshold. For example the threshold for transportation may be a velocity-impact resiliency threshold of at least about 10 m/s, at least about 20 m/s, or at least about 30 m/s. In select embodiments of the present disclosure, the threshold for transportation may be a compression-stress resiliency threshold. For example the threshold for transportation may be a compression-stress resiliency threshold of at least about 50 kN/m$^2$, at least about 200 kN/m$^2$, or at least about 500 kN/m$^2$. The compressive-stress resiliency threshold is highest for rail cars given the dimensions of containers. Shipping containers or tankers can also require large resiliency threshold depending on the dimensions of individual storage tanks.

Apparatus and Methods of Generating Asphaltene-Coated Bitumen Microcapsules

As noted above, one of the categories of microencapsulation approaches detailed in the present disclosure utilizes an actuated dual-flow nozzle to achieve core-shell encapsulation from concentric flows of bitumen and asphaltenes. The other utilizes a single bitumen stream that is dispersed into a bed of particulate asphaltenes. The results of the present disclosure evidence that each approach is capable of providing asphaltene-coated bitumen microcapsules having the physical parameters required to surpass key thresholds for midstream transportation, however aspects of the two categories of microencapsulation processes may also be combined to provide beneficial effects such as increased strength and decreased curing time through powder bed coating of a second conformal layer of asphaltenes after a first conformal layer is achieved via the concentric-flow approach. Without being bound to any particular theory, achieving core-shell encapsulation first from concentric flows of bitumen and asphaltenes may yield nascent asphaltene shells that that are relatively thin yet highly uniform, and these shells may be strengthened via the second approach as the nascent microcapsules are dispersed into the bed of powdered asphaltenes.

Select embodiments of the present disclosure relate to a method for generating a plurality of asphaltene-coated bitumen microcapsules, the method comprising:
(i) generating a plurality of concentric streams comprising a distal stream and a proximal stream, wherein the distal stream comprises asphaltenes, and wherein the proximal stream comprises bitumen, deasphalted oil, or a combination thereof;
(ii) modulating the proximal stream to form a plurality of microcapsule cores comprising the bitumen, the deasphalted oil, or the combination thereof;
(iii) modulating the distal stream to form a plurality of microcapsule shells comprising the asphaltenes, wherein (i), (ii), and (iii) are executed such that the plurality of microcapsule shells substantially encapsulate the plurality of microcapsule cores to form a plurality of nascent asphaltene-coated bitumen microcapsules; and
(iv) curing the asphaltenes, the bitumen, the deasphalted oil, or the combination thereof, such that the plurality of nascent asphaltene-coated bitumen microcapsules harden into a plurality of asphaltene-coated bitumen microcapsules that are, on average, sufficiently mechanically resilient to surpass a threshold for transportation.

In select embodiments of the present disclosure, the proximal stream comprises deasphalted oil that is deasphalted with a $C_5$-$C_7$ hydrocarbon. In select embodiments of the present disclosure, the proximal stream has a temperature of: (i) between about 60° C. and about 120° C.; (ii) between about 70° C. and about 100° C.; or (iii) between about 75° C. and about 85° C. In select embodiments of the present disclosure, the proximal stream has a flow rate of: (i) between about 0.2 mL/min and about 10.0 mL/min; (ii) between about 0.4 mL/min and about 5.0 mL/min; or (iii) between about 1.5 mL/min and about 3.0 mL/min.

In select embodiments of the present disclosure, the distal stream comprises xylene, chloroform, tetrahydrofuran, toluene, carbon tetrachloride, or a combination thereof. In select embodiments of the present disclosure, the distal stream has an asphaltene content of: (i) between about 0.2 mg/mL and about 2.0 mg/mL; (ii) between about 0.3 mg/mL and about 1.0 mg/mL; or (iii) between about 0.5 mg/mL and about 0.9 mg/mL. In select embodiments of the present disclosure, the distal stream has a temperature of: (i) between about 10° C. and about 80° C.; (ii) between about 15° C. and about 60° C.; or (iii) between about 20° C. and about 30° C. In select embodiments of the present disclosure, the distal stream has a flow rate of: (i) between about 0.2 mL/min and about 10.0 mL/min; (ii) between about 0.4 mL/min and about 5.0 mL/min; or (iii) between about 1.5 mL/min and about 3.0 mL/min.

In select embodiments of the present disclosure, the modulating of the distal stream, the modulating of the proximal stream, or a combination thereof comprises operating a pulsation unit to interrupt the proximal stream, the distal stream, or the combination thereof. In select embodiments of the present disclosure, the operating of the pulsation unit comprises vibrating at a frequency of: (i) between about 10 Hz and about 1 MHz; (ii) between about 100 Hz and about 1,000 Hz; or (iii) between about 200 Hz and about 400 Hz. In select embodiments of the present disclosure, the modulating of the distal stream, the modulating of the proximal stream, or a combination thereof comprises interrupting the proximal stream, the distal stream, or the combination thereof using an alternative means, such as by using a compressed gas, by rapid mechanical actuation, or by applying an electrostatic charge.

In select embodiments of the present disclosure, the curing of the asphaltenes, the bitumen, the deasphalted oil, or the combination thereof comprises cooling in the presence of water, alcohol, a surfactant, or a combination thereof.

In select embodiments of the present disclosure, the curing of the asphaltenes, the bitumen, the deasphalted oil, or the combination thereof further comprises aging the asphaltene-coated bitumen microcapsules in the presence of air, an inert gas, or a combination thereof.

In select embodiments of the present disclosure, the method may further comprise dispersing the nascent asphaltene-coated bitumen microcapsules in a plurality of particles comprising asphaltenes.

Select embodiments of the present disclosure relate to an apparatus for generating a plurality of asphaltene-coated bitumen microcapsules, the apparatus comprising:
a discharging element comprising a plurality of concentric outlets, the plurality of concentric outlets comprising:
a proximal outlet for discharging a proximal stream comprising bitumen, deasphalted oil, or a combination thereof, from the discharging element, and
a distal outlet for discharging a distal stream, comprising asphaltenes, from the discharging element;
a plurality of controls for modulating the proximal stream, the distal stream, or a combination thereof to form: (i) a plurality of microcapsule cores comprising the bitumen, the deasphalted oil, or the combination thereof, (ii) a plurality of microcapsule shells comprising the asphaltenes, and (iii) the plurality of microcapsule cores and the plurality of microcapsule shells into a plurality of nascent asphaltene-coated bitumen microcapsules; and
a vessel for receiving at least a portion of the plurality of nascent asphaltene-coated bitumen microcapsules and curing the asphaltenes, the bitumen, the deasphalted oil, or the combination thereof, such that the plurality of nascent asphaltene-coated bitumen microcapsules harden into a plurality of asphaltene-coated bitumen microcapsules that are, on average, sufficiently mechanically resilient to surpass a threshold for transportation.

In select embodiments of the present disclosure, the discharging element may be a prilling head or a nozzle. In select embodiments of the present disclosure, the distal outlet and the proximal outlet may have diameters of: (i) about 150 μm and about 200 μm, respectively; (ii) about 300 μm and about 700 μm, respectively; (iii) about 450 μm and about 700 μm, respectively; (iv) about 450 μm and about 900 μm, respectively; (v) about 450 μm and about 1,000 μm, respectively; or (vi) about 750 μm and about 1,000 μm, respectively.

In select embodiments of the present disclosure, the apparatus further comprises a pulsation unit that is configured to interrupt the proximal stream, the distal stream, or a combination thereof.

In select embodiments of the present disclosure, the vessel for receiving the nascent asphaltene-coated bitumen microcapsules may comprise water, alcohol, or a combination thereof. In select embodiments of the present disclosure, the bath may comprise a surfactant such as an alginate, pluronic F-127, perfluorooctanesulfonic acid, Triton X-100, or a combination thereof. In select embodiments of the present disclosure, the surfactant may have a concentration of: (i) between about 0.1 wt. % and about 10 wt. %, (ii) between about 0.5 wt. % and about 5.0 wt. % or (iii) between about 1.0 wt. % and about 3.0 wt. %. In select embodiments of the present disclosure, the bath may have a temperature of: (i) between about 10° C. and about 80° C.; (ii) between about 20° C. and about 70° C.; or (iii) between about 40° C. and about 60° C.

In select embodiments of the present disclosure, the vessel further comprises an agitator that is configured to prevent agglomeration of the plurality of nascent asphaltene-coated bitumen microcapsules.

FIG. 1 shows a schematic of an apparatus 100 in accordance with the present disclosure. For sake of clarity, the apparatus 100 is depicted at lab scale, but this depiction does not limit the scope of the present disclosure. Pilot-scale and/or commercial-scale embodiments in accordance with the present disclosure may be derived from the teachings set out herein. The apparatus 100 comprises a discharging element 102 with a proximal outlet 104 and a distal outlet 106. The proximal outlet 104 discharges a proximal stream 108, comprising bitumen, deasphalted oil, or a combination thereof. The distal outlet 106 discharges a distal stream 110, comprising asphaltenes. The apparatus 100 further comprises a plurality of controls for modulating the proximal stream 108, the distal stream 110, or a combination thereof to form: (i) a plurality of microcapsule cores comprising the bitumen, the deasphalted oil, or the combination thereof, (ii) a plurality of microcapsule shells comprising the asphaltenes, and (iii) the plurality of microcapsule cores and the plurality of microcapsule shells into the plurality of asphaltene-coated bitumen microcapsules. For example, in FIG. 1, the discharging element comprises a heating element, the temperature of which may be modulated to influence the temperature of the proximal stream 108, the distal stream 110, or a combination thereof.

In FIG. 1, the apparatus 100 further comprises a vessel for curing the asphaltenes, the bitumen, the deasphalted oil, or the combination thereof, such that the asphaltene-coated bitumen microcapsules are, on average, sufficiently mechanically resilient to surpass a threshold for transportation.

In FIG. 1, a single microcapsule 112 is depicted in Panel A, and the microcapsule core and the microcapsule shell are indicated by reference numbers 114 and 116, respectively. In FIG. 1, a plurality of asphaltenes are depicted in Panel B as indicated by reference number 118.

With respect to the discharging element 102, the radius of the proximal outlet ($r_p$) and the radius of the distal outlet ($r_d$) may vary. In select embodiments of the present disclosure, the proximal outlet may have a radius of about 150 μm, about 300 μm, about 450 μm, or about 750 μm. In select embodiments of the present disclosure, the distal outlet may have a radius of about 200 μm, about 700 μm about 900 μm or about 1000 μm.

In select embodiments of the present disclosure, the plurality of controls may comprise a pulsation unit for disrupting laminar flow from the proximal outlet 104 and/or the distal outlet 106. In select embodiments, the plurality of controls may comprise one or more heaters and/or thermostats for modulating the temperature of the proximal stream 108 and/or the distal stream 110. In select embodiments of the present disclosure, the plurality of controls may comprise one or more flow regulators (such as one or more pumps) for modulating the flow rate of the proximal stream 108, the distal stream 110, or a combination thereof. In select embodiments of the present disclosure, the plurality of controls may comprise one or more dilution and/or dispersion regulators for modulating the composition of the proximal stream 108, the distal stream 110, or a combination thereof.

With further reference to FIG. 1, syringe pumps may be used for flowing a colloidal dispersion of asphaltenes and heated bitumen to the distal outlet 106 and the proximal 104 outlet, respectively. Polyvinylchloride (PVC) tubing and steel pipe may be used to transport the distal stream 110 and the proximal stream 108, respectively, and may be held at temperatures of about 23° C. and about 80° C. The distal outlet 106 and the proximal outlet 104 may be part of a heated concentric nozzle system, which may be coupled to a pulsation unit for disrupting laminar flow by mechanical vibrations. The apparatus 100 may further comprise a heated air column 120 with air inlets 122 to establish a counter-current flow and aid solvent removal from nascent microcapsules, and the temperature and length of the heated air column 120 may be about 45° C. and about 40", respectively.

Without being bound to any particular theory, the interplay between two primary considerations may underlie apparatus and methods for generating asphaltene-coated bitumen microcapsules via concentric stream mixing: (i) the rate of mixing of asphaltenes with bitumen and/or deasphalted oil in mixed flows; and (ii) the rate of solvent evaporation from the colloidal dispersion of asphaltenes (which may in turn determine the rate at which the asphaltenes crosslink). The latter process may occur faster than the former to enable a shell to be constituted before the miscibility of bitumen and asphaltenes results in their amalgamation to form an effectively single-phase viscoelastic liquid.

With respect to solvent selection for dispersion, the Hildebrand solubility parameter for different kinds of asphaltenes can vary from 16-24 $MPa^{1/2}$. Solvents whose miscibility range overlap with those of asphaltenes and have either intermediate polarity or aromaticity have been considered as media to enable laminar flow of colloidal asphaltene dispersions in a concentric nozzle construct. Examples of such solvents include toluene, p-xylene, $CHCl_3$, $CCl_4$, 1-chloropentane, tetrahydrofuran, tetrachloroethylene (PCE), and cyclopentanone. The solvent may: (i) have a low boiling point to facilitate its rapid elimination and cross-linking of asphaltenes; (ii) disperse a high concentration of asphaltenes to enable high-solid-content dispersions; (iii) be sparingly soluble in water to enable use of aqueous collection baths, and must have a high flash point to enable safe handling at high process temperatures. $CHCl_3$ and $CCl_4$ satisfy this stringent set of criteria.

Despite being a good dispersant for asphaltenes, the high boiling point of $CCl_4$ (76.7° C.) may result in a slow evaporation rate. As such, considerable mixing of bitumen and asphaltenes may occur before a shell can be constituted. The relatively higher vapor pressure of $CHCl_3$ (about 25.9 kPa at about 25° C.) results in a higher evaporation rate and may aid the formation of conformal asphaltene shells that hold their shape upon impacting the collection bath. Concentrations as high as about 0.7 g asphaltenes/mL of $CHCl_3$ may be obtained, enabling highly concentrated colloidal dispersions to be used to establish concentric laminar flows.

Select embodiments of the present disclosure relate to a method for generating a plurality of asphaltene-coated bitumen microcapsules, the method comprising:
dispersing a plurality of droplets comprising bitumen, deasphalted oil, or a combination thereof into a plurality of particles comprising asphaltenes such that: (i) the bitumen, the deasphalted oil, or the combination thereof form a plurality of microcapsule cores, (ii) the asphaltenes form a plurality of microcapsule shells, and (iii) the plurality of microcapsule shells substantially encapsulate the plurality of microcapsule cores to form a plurality of nascent asphaltene-coated bitumen microcapsules; and
curing the asphaltenes, the bitumen, the deasphalted oil, or the combination thereof such that the plurality of nascent asphaltene-coated bitumen microcapsules harden into a plurality of asphaltene-coated bitumen microcapsules that are, on average, sufficiently mechanically resilient to surpass a threshold for transportation.

In select embodiments of the present disclosure, the deasphalted oil may be deasphalted with a $C_5$-$C_7$ hydrocarbon. In select embodiments of the present disclosure, the bitumen, the deasphalted oil, or the combination thereof may have a temperature of: (i) between about 60° C. and about 120° C.; (ii) between about 70° C. and about 110° C.; or (iii) between about 80° C. and about 100° C. In select embodiments of the present disclosure, the bitumen, the deasphalted oil, or the combination thereof may have a flow rate of: (i) between about 0.2 mL/min and about 60.0 mL/min; (ii) between about 2.0 mL/min and about 40.0 mL/min; or (iii) between about 5.0 mL/min and about 20.0 mL/min. In select embodiments of the present disclosure, the bitumen, the deasphalted oil, or the combination thereof may have a viscosity of: (i) between about 200 cP and about 700 cP; (ii) between about 300 cP and about 600 cP; or (iii) between about 400 cP mL/min and about 500 cP.

In select embodiments of the present disclosure, the asphaltenes comprise C7 asphaltenes. In select embodiments of the present disclosure, the asphaltenes have an average particle size of: (i) between about 20 μm and about 1,000 μm; (ii) between about 100 μm and about 700 μm; or (iii) between about 200 μm and about 500 μm. In select embodiments of the present disclosure, the asphaltenes may be pre-heated to: between about 50° C. and about 100° C.; (ii) between about 60° C. and about 90° C.; or (iii) between about 70° C. and about 80° C.

In select embodiments of the present disclosure, the dispersing of the bitumen, the deasphalted oil, or the combination thereof may further comprise operating a pulsation unit to interrupt flow. In select embodiments of the present disclosure, the operating of the pulsation unit comprises vibrating at a frequency of: (i) between about 10 Hz and about 1 MHz; (ii) between about 500 Hz and about 1,000 Hz; or (iii) between about 100 Hz and about 200 Hz. In select embodiments of the present disclosure, the interrupting of the dispersing of the bitumen, the deasphalted oil, or the combination thereof may be facilitated by an alternative means, such as by using a compressed gas, by rapid mechanical actuation, or by applying an electrostatic charge.

Select embodiments of the present disclosure relate to an apparatus for generating a plurality of asphaltene-coated bitumen microcapsules, the apparatus comprising:
a discharging element and a receiving vessel, wherein the discharging element is configured to disperse a plurality of droplets comprising bitumen, deasphalted oil, or a combination thereof into the receiving vessel, and the receiving vessel is configured receive the plurality of droplets in a plurality of particles comprising asphaltenes such that: (i) the bitumen, the deasphalted oil, or the combination thereof form a plurality of microcapsule cores, (ii) the asphaltenes form a plurality of microcapsule shells, and (iii) the plurality of microcapsule shells substantially encapsulate the plurality of microcapsule cores to form a plurality of nascent asphaltene-coated bitumen microcapsules; and
a curing vessel for curing the asphaltenes, the bitumen, the deasphalted oil, or the combination thereof, such that the plurality of nascent asphaltene-coated bitumen microcapsules harden into a plurality of asphaltene-coated bitumen microcapsules that are, on average, sufficiently mechanically resilient to surpass a threshold for transportation.

Figure 2:
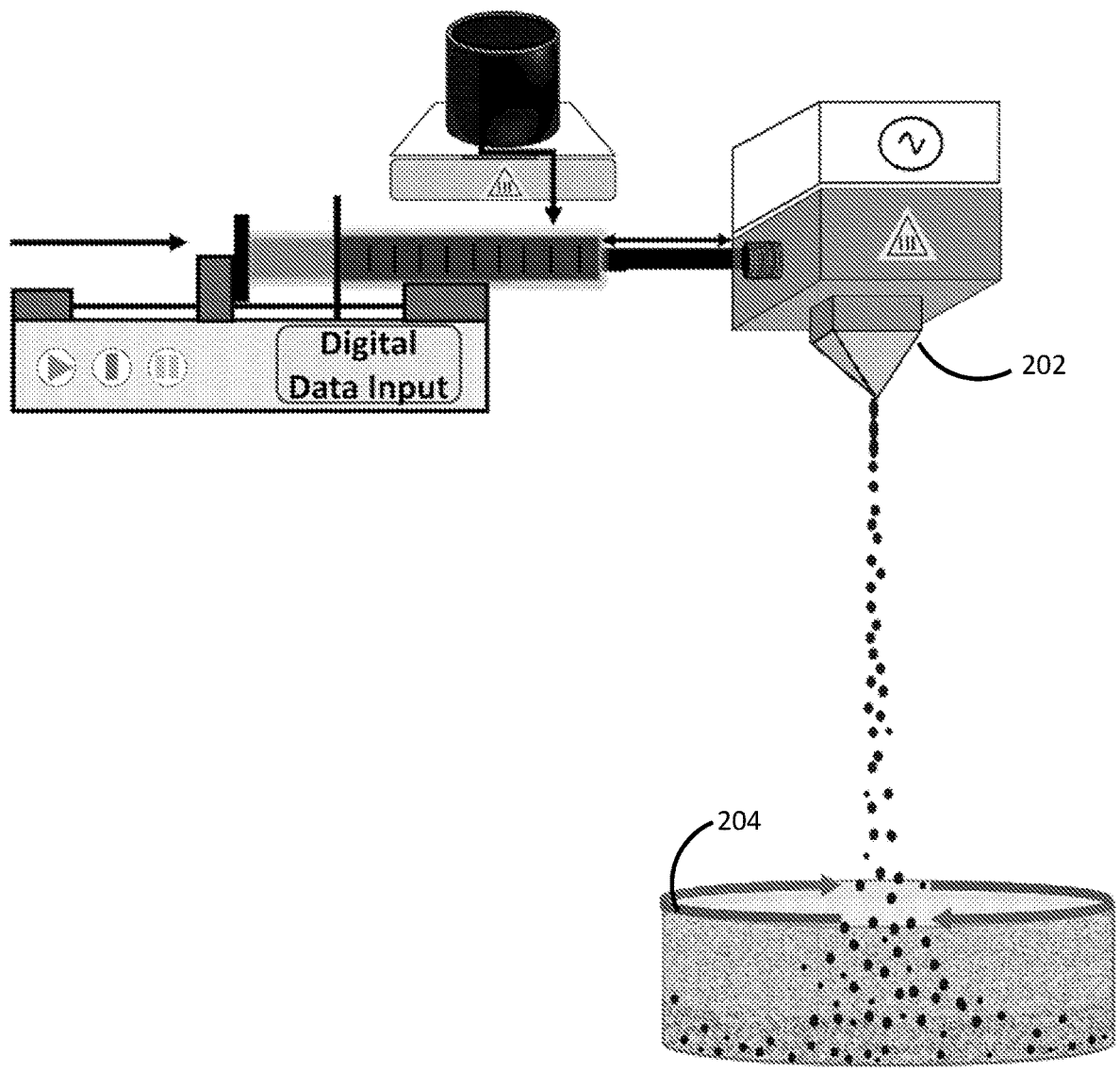
FIG. 2 shows a schematic of an apparatus featuring a single-nozzle setup for generating asphaltene-coated bitumen microcapsules in accordance with the present disclosure.

FIG. 2 shows a schematic of an apparatus 200 in accordance with the present disclosure. For sake of clarity, the apparatus 200 is depicted at lab scale, but this depiction does not limit the scope of the present disclosure. Pilot-scale and/or commercial-scale embodiments in accordance with the present disclosure may be derived from the teachings set out herein. The apparatus 200 comprises a discharging element 202 and a receiving vessel 204, wherein the discharging element 202 is configured to disperse a plurality of droplets comprising bitumen, deasphalted oil, or a combination thereof into the receiving vessel 204, and the receiving vessel 204 is configured receive the plurality of droplets in a plurality of particles comprising asphaltenes such that: (i) the bitumen, the deasphalted oil, or the combination thereof form a plurality of microcapsule cores, (ii) the asphaltenes form a plurality of microcapsule shells, and (iii) the plurality of microcapsule shells substantially encapsulate the plurality of microcapsule cores to form a plurality of nascent asphaltene-coated bitumen microcapsules. In FIG. 2, the receiving vessel also acts as a curing vessel for curing the asphaltenes, the bitumen, the deasphalted oil, or the combination thereof, such that the plurality of nascent asphaltene-coated bitumen microcapsules harden into a plurality of asphaltene-coated bitumen microcapsules that are, on average, sufficiently mechanically resilient to surpass a threshold for transportation.

The discharging element 202 may comprise a single flow nozzle equipped with a mechanical vibration unit with a predetermined frequency to disrupt the laminar flow to create droplets. The nozzle size and frequency of vibration may be used to modify the size of the droplets. In select embodiments of the present disclosure, the vibration frequency may be: (i) between about 10 Hz and about 1 MHz; (ii) between about 500 Hz and about 1,000 Hz; or (iii) between about 100 Hz and about 200 Hz.

The radius of the outlet ($r_o$) may vary. In select embodiments of the present disclosure, the outlet may have a radius of: (i) between about 100 μm and about 1,200 μm; (ii) between about 200 μm and about 1,000 μm; or (iii) between about 400 μm and about 800 μm.

In select embodiments of the present disclosure, the apparatus may further comprise a plurality of controls, such as a pulsation unit for disrupting laminar flow from the discharging element 202. In select embodiments of the present disclosure, the plurality of controls may comprise one or more heaters and/or thermostats for modulating the temperature of the plurality of droplets comprising bitumen, deasphalted oil, or a combination thereof. In select embodiments of the present disclosure, the plurality of controls may comprise one or more flow regulators (such as one or more pumps) for modulating flow rate. In select embodiments of the present disclosure, the plurality of controls may comprise one or more dilution and/or dispersion regulators for modulating the composition plurality of droplets comprising bitumen, deasphalted oil, or a combination thereof.

In select embodiments of the present disclosure, the curing vessel may have a temperature of: (i) between about 50° C. and about 100° C.; (ii) between about 60° C. and about 90° C.; or (iii) between about 70° C. and about 80° C.

EXAMPLES

Example 1: Microencapsulation Using Concentric Streams

Asphaltene-coated bitumen microcapsules having a variety of physical properties were prepared using a concentric stream approach. The assembly of the asphaltene shells was driven by solvent removal and temperature change. The asphaltene-coated bitumen microcapsules were determined to have an average diameter of about 3.74±1.00 µm. The asphaltene-coated bitumen microcapsules were determined to comprise about 30 wt. % asphaltenes and about 70 wt. % bitumen, deasphalted oil, or a combination thereof. The mechanical resiliency of the asphaltene-coated bitumen microcapsules was determined to be inversely proportional to their diameter, and mechanical resiliency was found to generally increase with prolonged curing. Imaging suggests this may be the result of increased cross-linking in the asphaltenes shell. Asphaltene-coated bitumen microcapsules with a diameter of between about 2.4 mm and about 3.2 mm were found to surpass compression-stress thresholds between about 88 kN/m$^2$ and about 149 kN/m$^2$.

A custom-designed microencapsulation apparatus was used to create asphaltene-coated bitumen microcapsules. The custom-designed microencapsulation apparatus comprised a concentric nozzle connected to outer and inner liquid pumping units, as shown schematically in FIG. 1. The concentric nozzle was attached to a pulsation unit through a magnetic holder to break up the laminar liquid jet into droplets. The nozzle was integrated with a heater to enable the flowability of viscous solutions.

C7 asphaltenes were ground using a mortar and pestle, yielding mean aggregate size of about 15.5±130.8 µm measured by a laser scattering particle size distribution analyzer. Finely ground asphaltenes were then dispersed in $CHCl_3$ (about 3.5 g/mL) and the mixture was mechanically stirred for 24 h. Bitumen was heated to 100° C. for 1 h to achieve the desired flow characteristics.

The colloidal dispersion of asphaltenes and preheated bitumen were individually transferred to syringe pumps, which were maintained at about 23° C. and about 80° C., respectively. Both syringe pumps were connected to the preheated (about 80° C.) concentric nozzles on the automated jetting system. The outlet of the syringe pumps feeding from the colloidal dispersion of asphaltenes was connected through a polyvinyl chloride (PVC) pipe to the outer (i.e. distal) nozzle of the concentric nozzle system, whereas the bitumen syringe outlet was connected through a low-alloy steel pipe maintained at about 80° C. to the inner (i.e. proximal) nozzle of the concentric nozzle system.

Concentric nozzles with inner and outer diameter combinations of about 150 µm/200 µm, about 300 µm/700 µm, about 450 µm/700 µm, about 450 µm/1000 µm, and about 450 µm/900 µm were assessed for their ability to form asphaltene-coated bitumen microcapsules. Optimal flow rates were achieved with a concentric nozzle having an inner diameter of about 750 µm and outer diameter of about 1,000 µm. To disrupt the concentric flow of outer asphaltene and inner bitumen flow streams, mechanical vibration was introduced using a pulsation unit. The frequency of the vibration, which directly impacts the size of the capsule, was set at 250 Hz. The apparatus comprised a 40" long glass collection tube (about 2.2" in diameter) with a detachable glass collection bath (about 7" in diameter) placed underneath. Heated air was passed through the air channel tube as depicted in FIG. 1 to aid drying of the descending microcapsules. The collection bath contained about 150 mL of an about 2 wt. % solution of a non-ionic surfactant (Pluronic F127), maintained at about 50° C. to reduce the surface tension of water and prevent agglomeration of the asphaltene-coated bitumen microcapsules. The temperature of the collection bath was maintained at about 50° C. The collection bath was placed on a stir plate and a magnetic stir bar was used at about 20 rpm during collection to prevent agglomeration of the beads.

An archetypal method for generating asphaltene-coated bitumen microcapsules involved flowing heated bitumen stream at about 0.8 mL/min and the asphaltenes dispersion stream at about 1 mL/min. The asphaltene-coated bitumen microcapsules were collected in collection baths ensuring that the concentration of asphaltene-coated bitumen microcapsules was below the agglomeration limit. The asphaltene-coated bitumen microcapsules were allowed to sit in the collection bath for about 3 days at room temperature without stirring and were then recovered from the collection bath by draining the collection bath solution. The collected asphaltene-coated bitumen microcapsules were further allowed to dry on aluminum foil in static air for about 3 days at about 23° C.

The viscosity of bitumen was determined using a rotational rheometer (Discovery Hybrid DHR-2 rheometer, TA Instruments) equipped with a dual stage Peltier plate. Approximately 1 mL of bitumen was placed between the stage and the 40 mm parallel plate, with a 500 µm gap, to ensure uniform contact across the plate. Viscosity was recorded across the temperature range of about 25° C. to about 150° C., ramping at a rate of about 5° C.·min$^{-1}$ at a constant shear rate of about 1.0 s$^{-1}$. Viscosity data was recorded and processed using the TA instruments software, TRIOS.

Confocal microscopy experiments to image the asphaltene-coated bitumen microcapsules were performed using a Leica DM 6B microscope. The microscope was equipped with a fluorescence-LED light source, set to Cy5 filter (about 650 nm excitation, about 670 nm emission). Asphaltene-coated bitumen microcapsules were sectioned in half using a single-edge razor blade to enable a cross-sectional view. Projection images were collected using a Leica DM4500 5-megapixel color camera coupled with a 2.5× objective lens. The exposure time was set to be greater than 7 s to enhance the contrast between the asphaltenes shell and bitumen core. Image processing and visualization were performed using ImageJ software.

Mechanical testing of the asphaltene-coated bitumen microcapsules was performed using a force transducer that was affixed perpendicular to a glass slide. The asphaltene-coated bitumen microcapsule to be evaluated was placed on the glass slide such that the center of the force transducer was in alignment with the center of the asphaltene-coated bitumen microcapsule. The glass slide was then raised using a mechanical stage at a rate of about 1 mm/s to bring the transducer in contact with the asphaltene-coated bitumen microcapsule. Upon contact, the asphaltene-coated bitumen microcapsule was initially deformed and subsequently underwent rupture at a critical load.

Figure 3:
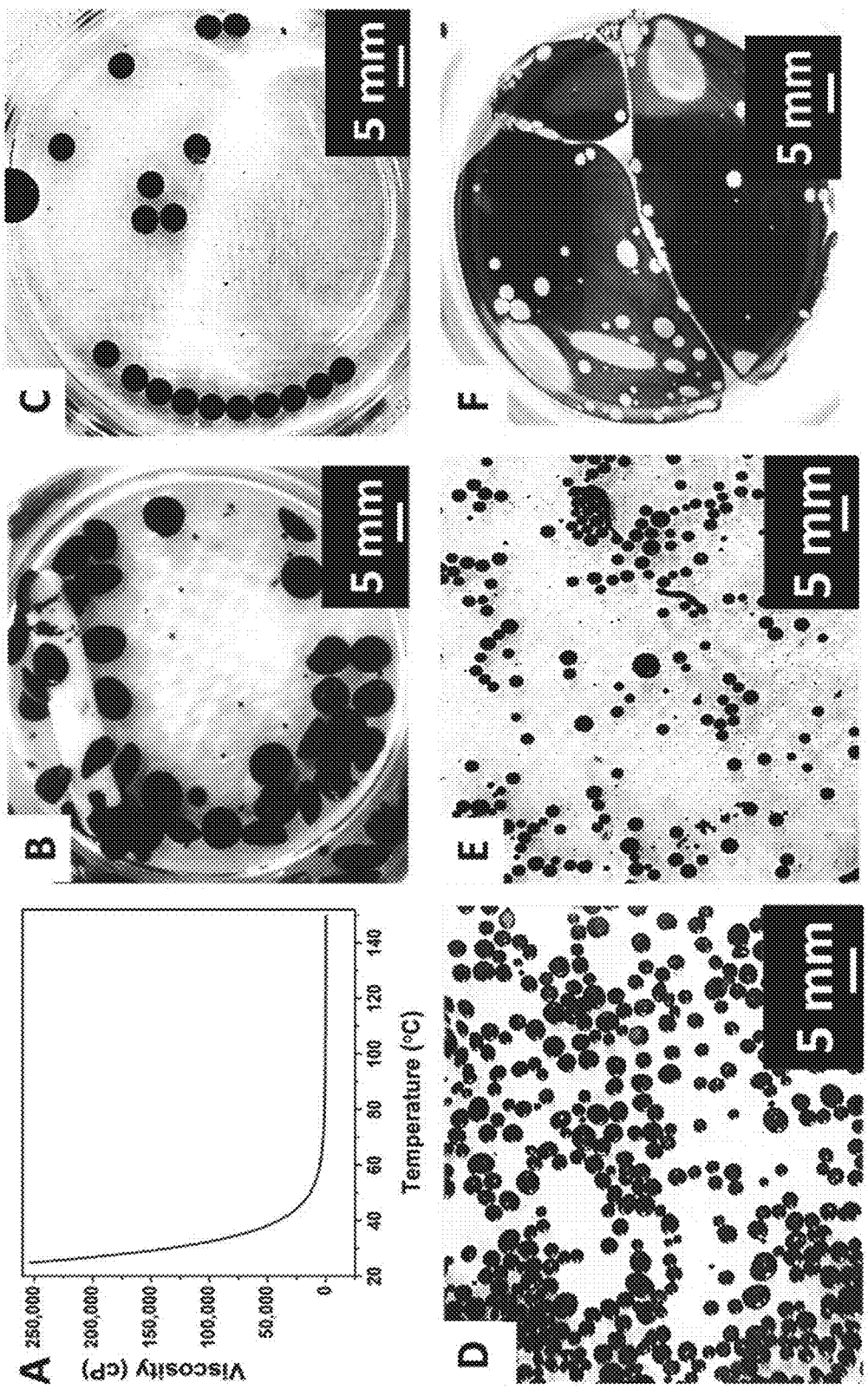
FIG. 3 shows: (i) a plot of bitumen viscosity as a function of temperature (Panel A); (ii) digital photographs of asphaltene-coated bitumen microcapsules in accordance with the present disclosure collected at bitumen flow temperatures of about 80° C., about 95° C., about 110° C., and about 115° C. (Panels B, C, D, and E, respectively); and (iii) a digital photograph of toluene-diluted bitumen at about 100° C. indicating formation of a surface film rather than retention of droplets.

FIG. 3, Panel A, shows a plot of the viscosity of the bitumen samples used in this example as a function of temperature. An operational window ranging from about 80° C. to about 115° C. was determined to be suitable for obtaining a laminar flow in the concentric nozzle. Microcapsules were obtained by interrupting the laminar flowstream using a pulsation unit at a minimum temperature of about 80° C. corresponding to a bitumen viscosity of about 1078 cP. FIG. 3, panels B, C, D, and E depict bitumen droplets collected at bitumen flow temperatures of about 80° C., about 95° C., about 110° C., and about 115° C., respectively. Bitumen temperatures between about 80° C. and about 115° C. were found to preserve a substantially spherical droplet shape. FIG. 3, Panel F depicts the reduced viscosity of bitumen from dilution with toluene that yields poorly formed droplets that rapidly disintegrate within the collection bath. While under the present conditions laminar bitumen flowstreams were be established and spherical beads were be stabilized in the range of about 80° C. to about 115° C. in a concentric nozzle geometry, the higher end of this range promoted rapid $CHCl_3$ evaporation, which may result in clogging of the nozzles by asphaltenes. As such, a bitumen temperature of about 80° C. was used in select subsequent experiments with an outer nozzle size of about 1,000 μm and bitumen flow rates ranging from about 0.6 mL/min to about 2 mL/min. The frequency of the pulsation unit was set at 250 Hz.

The present example employed a proximal flowstream of heated bitumen at about 80° C., and an about 0.7 mg/mL colloidal dispersion of asphaltenes in $CHCl_3$ as the distal flowstream. A pulsation unit was used to interrupt the laminar flows and imbues a spherical geometry to the incipient microcapsules. In order to facilitate rapid asphaltene cross linking, such as attenuate asphaltenes dissolving into the core, solvent evaporation was initiated at the tip of the heated nozzle and was continued down an air column with counter-current flow maintained at about 45° C., as illustrated in FIG. 2. The remaining solvent in the asphaltene-coated bitumen microcapsules was evaporated in the collection bath, which was held at about 50° C.

The collection bath was configured in a variety of ways to modulate surface tension. The high surface tension of water may give rise to interfacial interactions that rupture the incipient microcapsules. As such, different surfactants were explored to reduce the surface tension of water, enabling the asphaltene-coated bitumen microcapsules to hold their form until such time that the solvent is eliminated.

Figure 4:
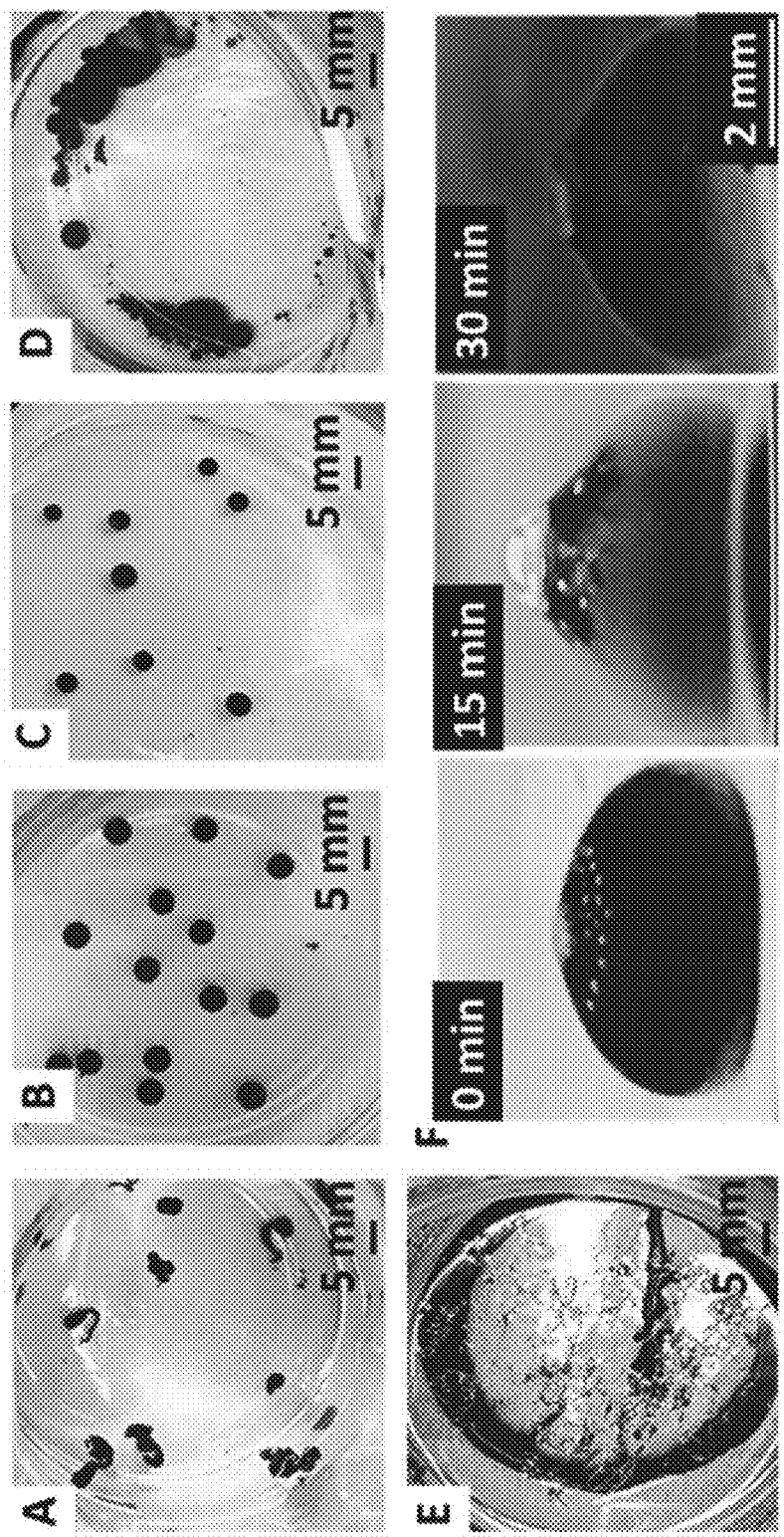
FIG. 4 shows: (i) digital photographs of asphaltene-coated bitumen microcapsules in accordance with the present disclosure collected using a water collection bath (Panel A), an about 2 wt. % alginate collection bath (Panel B), an about 2 wt. % pluronic F-127 collection bath (Panel C), a perfluorooctanesulfonic acid collection bath (Panel D), and a Triton X-100 collection bath (Panel E); and (ii) time lapse images depicting evaporation of solvent from a asphaltene-coated bitumen microcapsule in accordance with the present disclosure as a function of time (about 0 min, about 15 min, and about 30 min) in an about 2 wt. % Pluronic F-127 collection bath.

FIG. 4 shows: (i) digital photographs of microcapsules collected using a water collection bath (Panel A), an about 2 wt. % alginate collection bath (Panel B), an about 2 wt. % pluronic F-127 collection bath (Panel C), a perfluorooctanesulfonic acid collection bath (Panel D), and a Triton X-100 collection bath (Panel E); and (ii) time lapse images depicting evaporation of solvent from a microcapsule as a function of time (about 0 min, about 15 min, and about 30 min) in an about 2 wt. % Pluronic F-127 collection bath.

Under the test conditions, the polysaccharide amphiphile, alginate, yielded discrete unagglomerated microcapsules. However, it constitutes a conformal coating that retained solvent ($CHCl_3$), which may facilitate asphaltenes mixing with the bitumen core before the shell is cross-linked. The amphiphilic poly(ethylene oxide)-poly(propylene oxide)-poly(ethylene oxide) copolymer, pluronic F-127, allowed for well-defined microcapsules to hold their form while enabling removal of $CHCl_3$ from the shell as shown in the time lapse images of FIG. 4, Panel F. The temperature of the collection bath may play an important role in aiding elimination of the solvent. Under the test conditions evaluated, the maximum allowable temperature for evaporating solvent from the asphaltenes shell without rupturing the was determined to be about 50° C.

Figure 5:
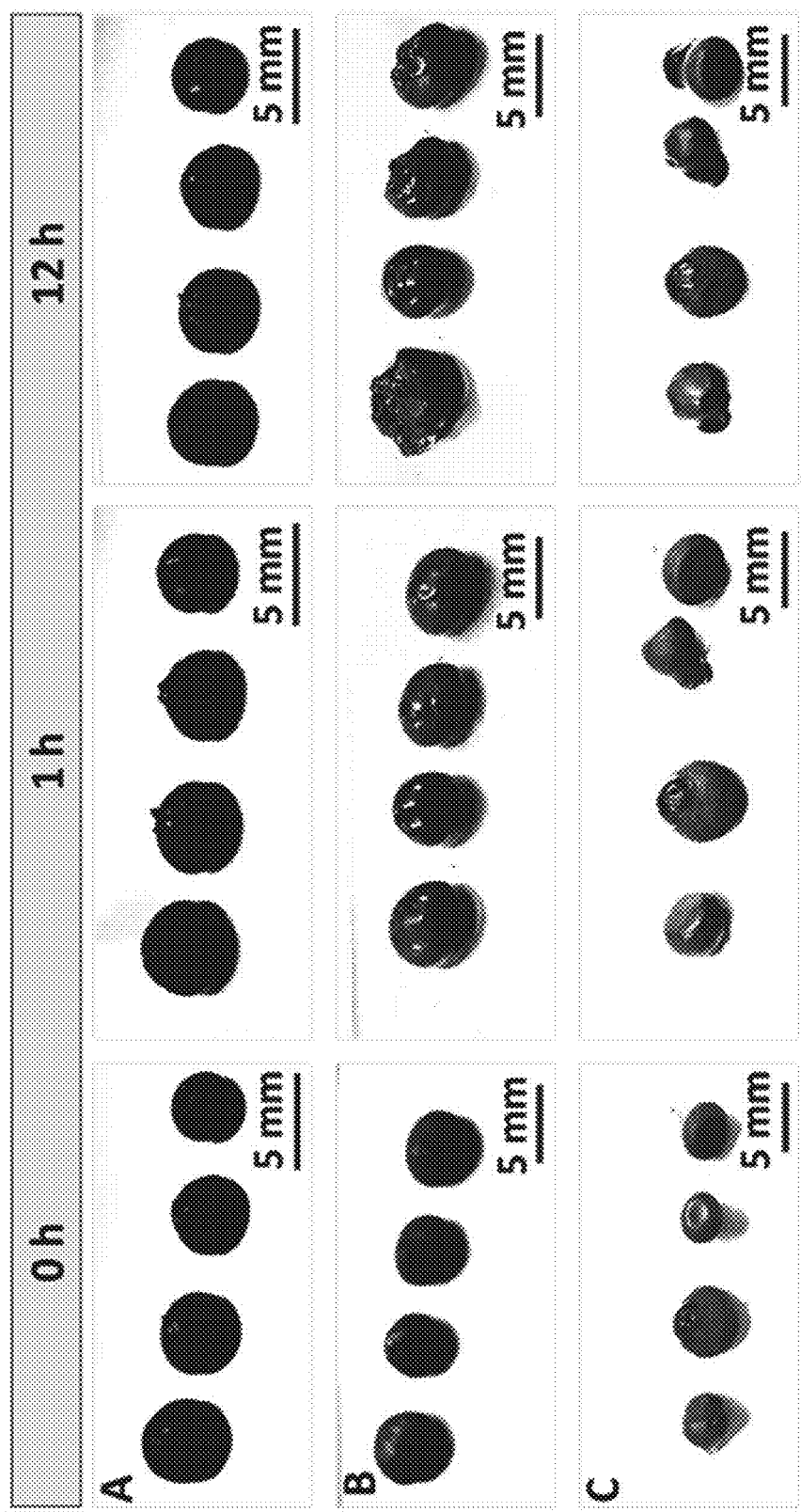
FIG. 5 shows time-lapse digital photographs (about 0 h, about 1 h, about 12 h) of asphaltene-coated bitumen microcapsules in accordance with the present disclosure curing: (i) under static air (Panel A); under $N_2$ flow (Panel B); and (iii) under Argon flow (Panel C).

FIG. 5 shows time-lapse photographs (about 0 h, about 1 h, about 12 h) of asphaltene-coated bitumen microcapsules drying: (i) under static air (Panel A); under $N_2$ flow (Panel B); and (iii) under Argon flow (Panel C). The results suggest that under the test conditions evaluated, high flow rates and resulting rapid removal of solvent gives rise to surface forces that can rupture the microcapsules. Whereas, under the test conditions evaluated, curing in static air preserves the integrity of the microcapsules.

The composition of microcapsules was calculated from the flow rate and density values of bitumen and asphaltenes flowstreams. Measured densities of bitumen at 80° C., asphaltenes solution, and chloroform at about 23° C. are about 1.01 g/mL, about 1.08 g/mL, and about 1.49 g/mL, respectively. Given the flow rate and density of heated bitumen, the mass flow rate of bitumen was about 0.81 g/min, whereas the mass flow rate of the asphaltenes solution was about 1.08 g/min (asphaltenes were dispersed in chloroform at about 0.7 g/mL). As such, the microcapsules comprise about 30 wt. % asphaltenes and about 70 wt. % of bitumen, deasphalted oil, or a combination thereof.

Figure 6:
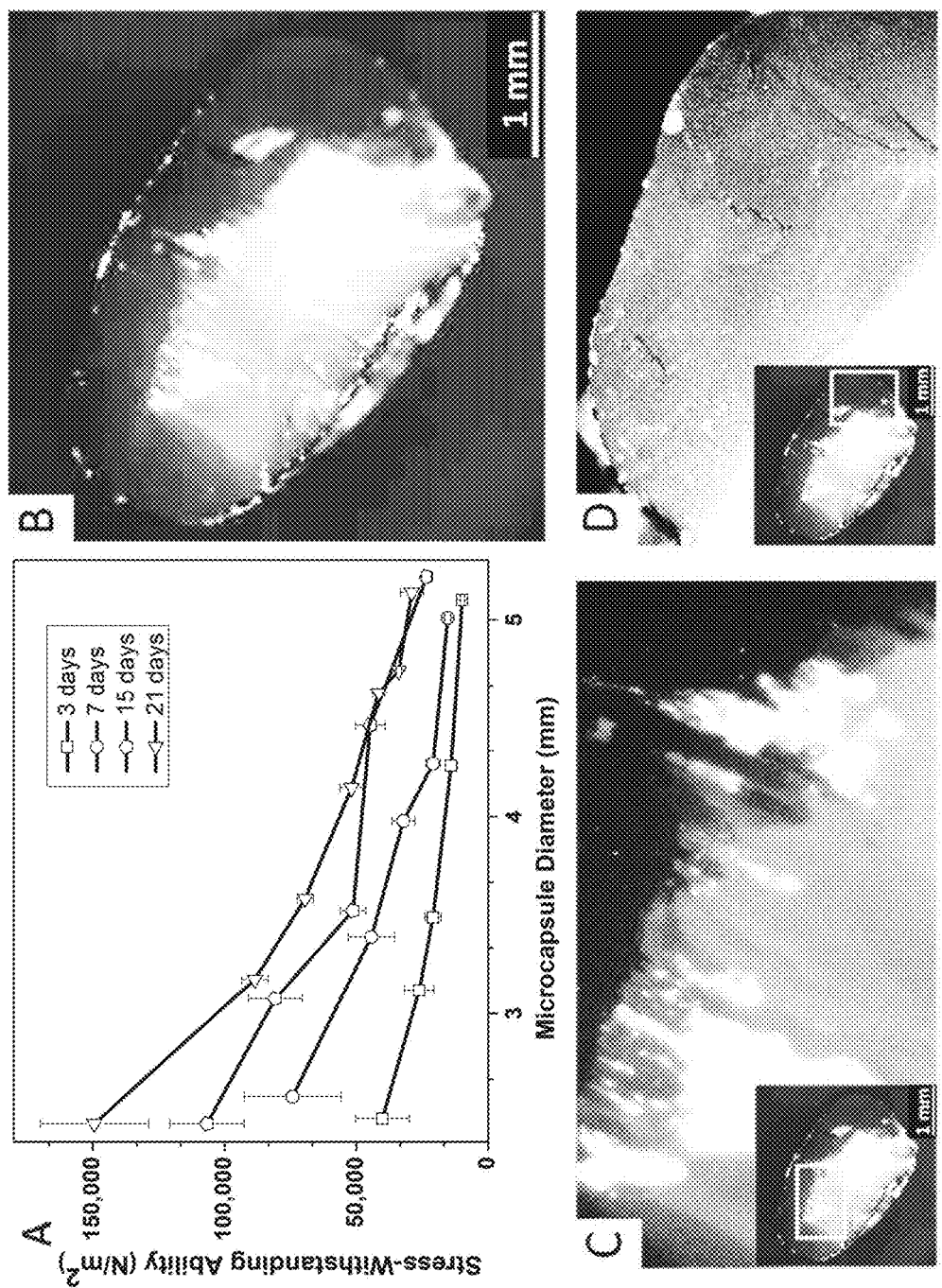
FIG. 6 shows: (i) a plot of the compression-stress resiliency of a collection of asphaltene-coated bitumen microcapsules in accordance with the present disclosure as a function of their diameter and drying time (Panel A); (ii) a cross-sectional confocal image of a sectioned asphaltene-coated bitumen microcapsule in accordance with the present disclosure (Panel B); (iii) a high-magnification expansion of the sectioned microcapsule showing thread-like projection of asphaltenes from the shell (Panel C); and (iv) a high-magnification expansion of the sectioned microcapsule showing surface texture of the shell (Panel D).

FIG. 6 Panel A shows a plot of the compression-stress resiliency of an archetypal collection of microcapsules as a function of their diameter and drying time. The compression-stress resiliency of the microcapsules was measured over the course of about 21 days at different intervals. The compression-stress resiliency values were calculated from the force that deforms the microcapsules and the size of the microcapsules. In general, an increase in strength of the microcapsules was observed with decreasing microcapsule diameter. For smaller microcapsule dimensions, an increased surface-area-to-volume ratio likely resulted in an increase in the relative amount of cross-linked asphaltenes. The finding that the compression-stress resiliency of the microcapsules decreases with decreasing asphaltene content is consistent with the assertion that the mechanical strength of the microcapsules, as measured in these experiments, is derived at least in part from cross-linked asphaltenes. Importantly, under the test conditions evaluated the compression-stress resiliency of the microcapsules increases about 3 to about 5 times with increasing drying time. This finding is also consistent with the assertion that the increase in strength is a result of greater cross-linking of asphaltenes, which results in the hardening of the shells.

FIG. 6 Panels B, show a cross-sectional confocal image of a sectioned microcapsule. The liquid bitumen core shows a luminescent response as a result of the high abundance of conjugated aromatic moieties, and this is captured as a high-exposure surface as the image is converted to black and white. In contrast, non-radiative relaxation processes in solid asphaltenes quenches their luminescence. As shown in FIG. 6 Panel B, the cross-linked asphaltenes form a continuous shell around the liquid bitumen core. FIG. 6 Panel C shows a first high-magnification expansion of the sectioned microcapsule of Panel B. In the expansion of Panel C, thread-like projections are observed extending from the asphaltenes shell into the core. FIG. 6 Panel D shows a second high-magnification expansion of the sectioned microcapsule of Panel B. In the expansion of Panel D, a smooth and continuous texture is observed for the surfaces of the microcapsule, which is consistent with a high degree of asphaltene cross linking.

Example 2: Microencapsulation by Droplet Dispersion into Asphaltene Particulates A custom-designed microencapsulation apparatus was used to create asphaltene-coated bitumen microcapsules by droplet dispersion into asphaltene particulates, as shown schematically in FIG. 2. The apparatus comprises a modified Buchi Encapsulator B-390 procured from Buchi, a 200 mL stainless steel syringe from Chemyx, heating tape and 3.5"× 3.0" heating pads/jackets from Ace Glass, and a custom fabricated low-alloy steel pipe (7" in height, 1 cm in diameter). A stainless-steel syringe heated with two syringe heater pads delivers bitumen to a single-flow nozzle wrapped with heating tape, which in turn is equipped with a mechanical vibration unit with a digitally controlled frequency modulator that disrupts the laminar flow of bitumen to create discrete droplets.

In the present example, the method of generating microcapsules comprised initially heating about 50 mL bitumen in a 250 mL beaker at about 100° C. for about 12 h in a glass beaker and then extracting the bitumen into a stainless-steel syringe maintained at about 95° C. The viscosity of bitumen decreased to about 422 cP at about 95° C. from about 131,764 cP at about 25° C., as determined with a rotational rheometer (Discovery Hybrid DHR-2 rheometer, TA Instruments) equipped with a dual stage Peltier plate. The density of bitumen was measured to be about 1.01±0.01 g/mL at about 23° C. by weighing the mass of about 50 mL bitumen in a falcon centrifuge tube. The measurement was replicated thrice. The syringe was affixed to a high-pressure syringe pump that allowed for delivery of bitumen to the nozzle at pre-determined flow rates. As depicted in FIG. 2, the encapsulation assembly was set up by attaching a single nozzle with an opening of about 750 µm to the carrier plate on the Encapsulator B-390. The bitumen-containing syringe was connected to the single nozzle through a 7" low-alloy steel pipe maintained at about 95° C. The nozzle was further maintained at about 95° C. with heating tape. The bitumen droplets from the nozzle were collected in a glass pneumatic trough containing a powder bed of ground C7 asphaltenes (about 10 g). The ground asphaltenes in the collection bed were obtained by first grinding the C7 precipitated asphaltenes using an agate stone mortar and pestle, and further ball-milling of the resulting powder with methacrylate balls in about 2.5 mL polystyrene vial for about 30 min.

In the present example, the heated bitumen was injected through the heated nozzle at about 8 mL/min. To generate discrete droplets, the flow stream was interrupted using a pulsation unit with a frequency of about 150 Hz. The droplets impinged on a powder bed of ground asphaltenes, which was continuously shaken in a circular motion to facilitate the conformal coating of the droplets with the asphaltenes. The resulting bitumen beads were continuously shaken in at a minimum of 5 min intervals for the first 2 h, and then intermittently over 22 h. The temperature of the collection bed was varied from room temperature to about 75° C. by adjusting the temperature of the glass pneumatic trough containing asphaltenes, which was placed on a hot plate. The flow rates, the temperature of bitumen, and the diameter of the nozzle were adjusted to further control the size and composition of the microcapsules.

The density of ground asphaltenes was measured at about 23° C. by weighing the mass of asphaltenes in a 5 mL graduated measuring cylinder. Three replicate measurements were performed. The particle size distribution of asphaltenes was measured using a Horiba laser scattering particle size distribution analyzer (LA-960). A stable dispersion of about 3 g/L of ground asphaltenes in nano-pure water was prepared by manual shaking for 5 min. Three replicate measurements were performed. Scanning electron microscopy (SEM) images of asphaltenes were obtained using a JEOL JSM-7500F instrument operated at an accelerating voltage of about 5.0 kV. The ground asphaltenes and asphaltenes heated to about 75° C. on a hot plate for about 1 h were dispersed in 2-propanol and spread onto carbon tape. Dry samples on carbon tape were placed on an aluminum stub and sputter-coated with a 5 nm conductive film of platinum using a sputter coater (Sputter Coater 208 HR by Cressington) prior to imaging to prevent charge accumulation.

Cross-sectional and panoramic confocal images of the microcapsules were acquired using a Leica DM 6B microscope. The microscope was set to use a Cy5 (~650 nm excitation, 670 nm emission) filter. A 2.5× objective lens was used to acquire the images. The microcapsules were cut in half using a single-edge razor blade to enable the acquisition of cross-sectional images. The dimensions of different imaged elements were extracted using ImageJ software.

The mechanical properties of the microcapsules were examined using mechanical deformation and velocity impact measurements. Mechanical characterization was performed as a function of elapsed time for microcapsules of different dimensions for up to about 45 days from initial preparation. To examine stress-withstanding abilities, the microcapsules were subjected to compressive stress with a force transducer. The force transducer was placed perpendicular to the center of the microcapsules. The microcapsule was placed on a glass slide resting on a mechanical stage. The mechanical stage was moved upwards at a rate of about 10 mm/s. The force measured by the transducer at the point when the microcapsule was ruptured was noted and used to calculate the stress-withstanding abilities of the microcapsules based on the area of contact.

Velocity impact tests were carried out by impinging the beads onto two different substrates; a 0.6" thick 6061 aluminum bar from McMaster-Carr and a 0.2" thick corrugated cardboard substrate. The microcapsules were impinged onto the target surfaces using a F-16 slingshot. The terminal velocity at impact was calculated from the distance traveled and time elapsed as recorded using a Fastcam NOVA S9 high-speed camera equipped with canon EF-S 18-135 mm lens and a collimated LED light source (color temperature of about 6500K, cold white) from Thorlabs. The target surface was affixed perpendicular to the direction of the projectile. A scale was fixed perpendicular to the target surface to calculate the distance travelled by the microcapsule before hitting the target. The high-speed camera was set up perpendicular to the scale. The path of the projected microcapsule was illuminated with the collimated LED light source. The microcapsules were shot manually with a slingshot while the camera captured images of 896×512 pixel resolution at about 20,000 frames per seconds. The multiple frames were combined into a single video sequence using FASTCAM photo viewer software.

Figure 7:
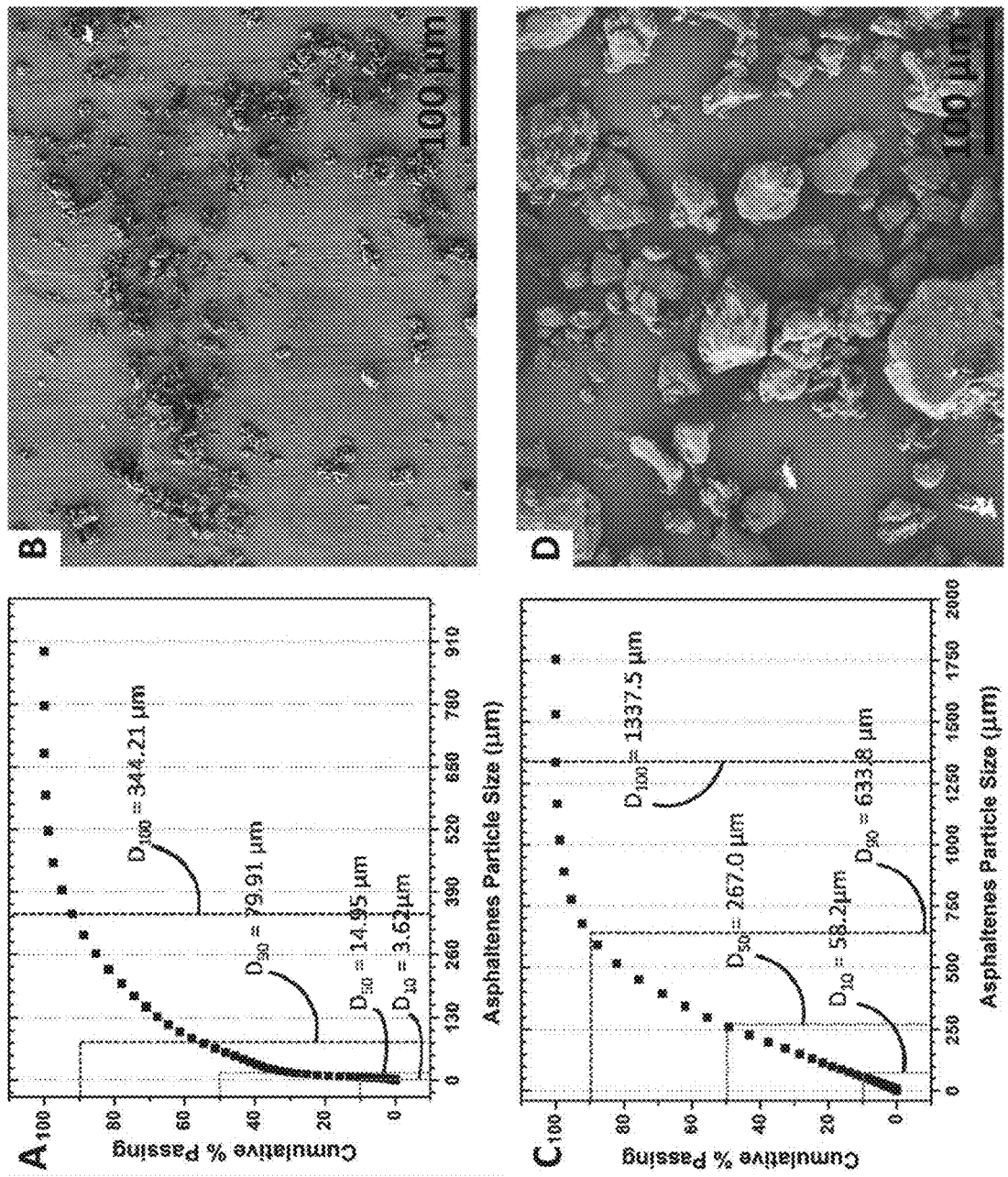
FIG. 7 shows: (i) an asphaltene particle size distribution curve for a sample prepared at 23° C. (Panel A); (ii) an SEM image of ground asphaltenes prepared at about 23° C. (Panel B); (iii) an asphaltene particle size distribution curve for a sample prepared at about 75° C. (Panel C); and (iv) an SEM image of ground asphaltenes heated to about 75° C. (Panel D).

In the present example, asphaltenes were recovered from bitumen by precipitation with heptanes. The solid asphaltenes were ground into a fine powder using a mortar and pestle followed by ball milling. FIG. 7, Panels A and C shows asphaltene particle size distribution as determined by laser scattering, and the plots indicate a size distribution centered at about 34.30±54.78 µm for room temperature asphaltenes and about 315.0±232.4 µm for asphaltenes heated to about 75° C. for about 1 h, respectively. FIG. 7, Panels B and D, depict SEM image of such asphaltenes (Panel B=room temperature, Panel D=about 75° C. for about 1 h). The increase in the aggregate size of asphaltenes upon heating may indicate crosslinking mediated by intermolecular interactions, and this increase is readily observed when comparing the SEM images shown in Panels B and D.

In the present example, the ground asphaltenes are charged into a powder bed that serves to collect bitumen droplets jetted using a mechanically actuated flow system depicted in FIG. 2. FIG. 7, Panels C and D demonstrate that the local heating of asphaltene shells by hot bitumen droplets may help initiate crosslinking of the conformal shell.

Figure 8:
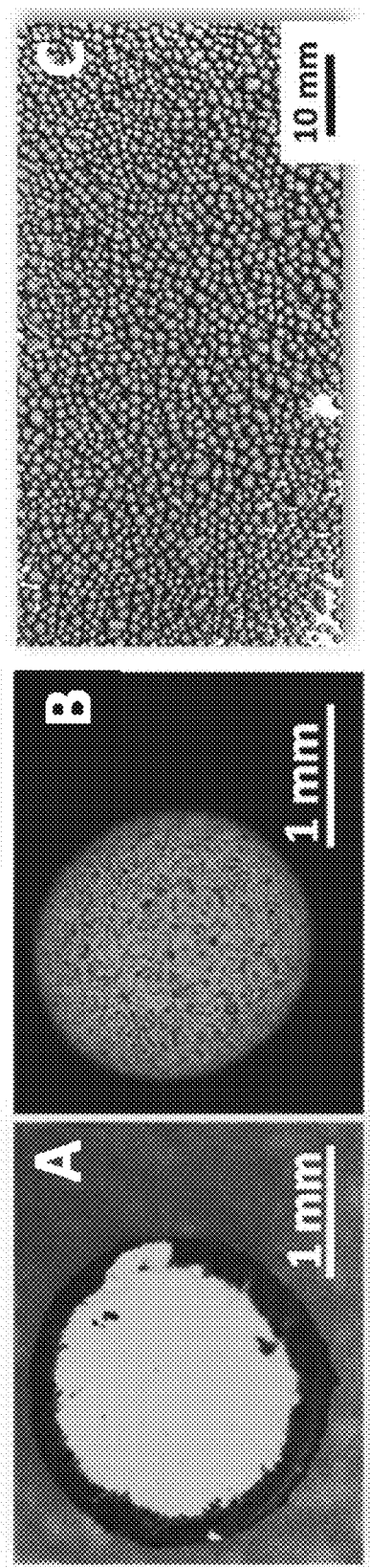
FIG. 8 shows: (i) a confocal image of a cross-sectioned asphaltene-coated bitumen microcapsule in accordance with the present disclosure (Panel A); (ii) a confocal image of an asphaltene-coated bitumen microcapsule (Panel B); and (iii) a digital photograph of a collection of asphaltene-coated bitumen microcapsules prepared in accordance with the present disclosure at a bitumen stream temperature of 95° C. and a bitumen injection rate of 8 mL/min with dispersion into in a bed of ground asphaltenes.

FIG. 8, Panels A and B show representative confocal microscopy images of the surface and cross-section of microcapsules fabricated in this manner using a nozzle size of about 750 µm and flow rate of about 8 mL/min. Owing to the high concentration of conjugated aromatic moieties, the liquid core shows a strong luminescent response upon photoexcitation; whereas, the luminescence response of asphaltenes is quenched in the solid state owing to the aggregation of the chromophores, which activates non-radiative relaxation channels. Luminescence imaging thus provides a sensitive means of differentiating the liquid bitumen core from the solid asphaltenes shell. In FIG. 8, Panel A and B, the asphaltenes accumulated by the bitumen droplet from the powder bed are observed to form a continuous shell. FIG. 8, Panel C shows a digital photograph of an ensemble of the microcapsules, demonstrating the viability and scalability of this approach. Owing to the extended conjugation in the asphaltenes, enhanced further by the presence of heteroatoms, asphaltenes absorb visible light and are brown black in color.

Figure 9:
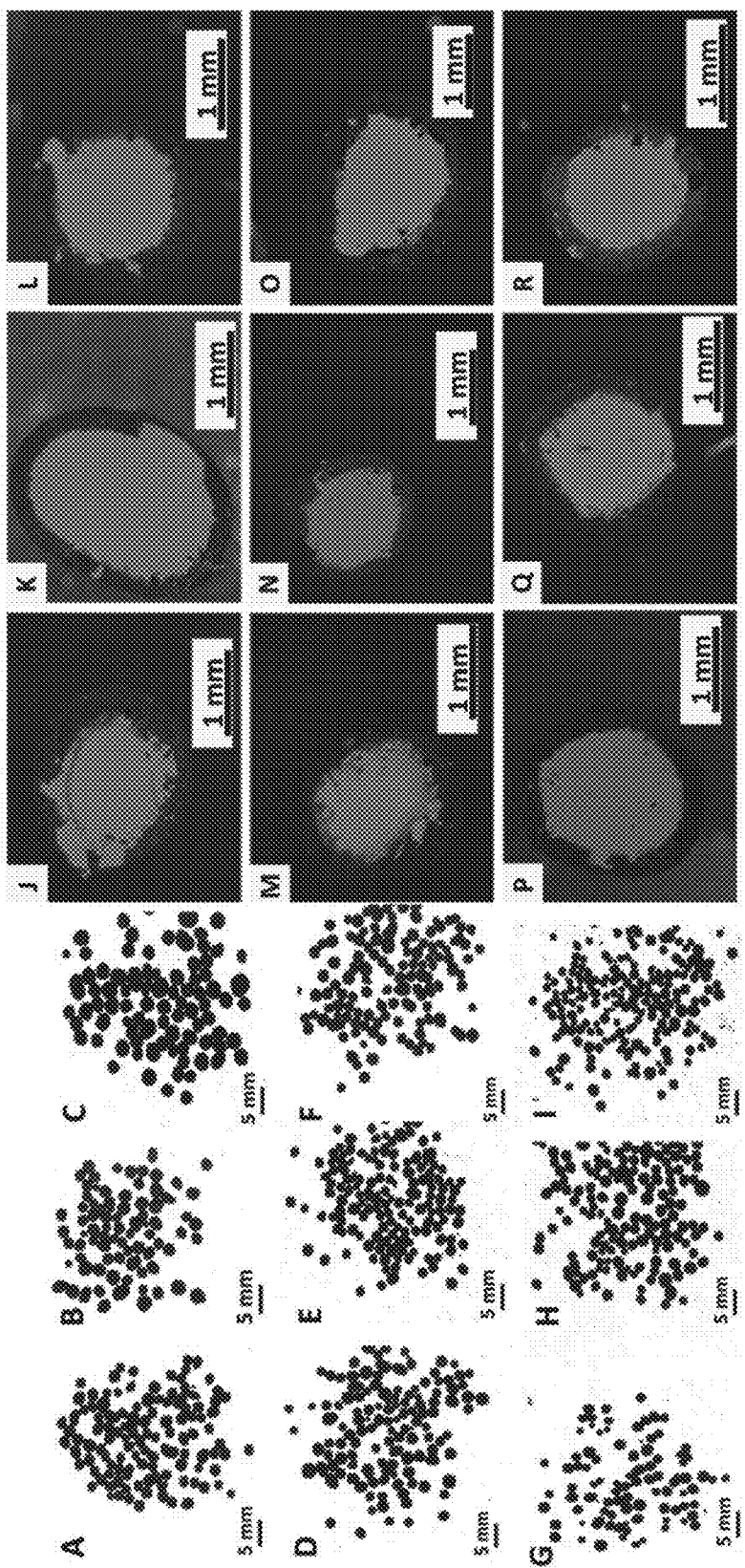
FIG. 9 shows: (i) digital photographs of asphaltene-coated bitumen microcapsules prepared in accordance with the present disclosure using the processing parameters set out in TABLE 1 (Panels A-I); and (ii) cross-sectional confocal images with dimensions as set out under Sample IDs A, C, and E in TABLE 1, respectively (Panels J-R).

The dimensions of the microcapsules can be modulated by varying the temperature of the delivery system, nozzle size, and flow rate. The frequency of the pulsation unit is seen not to have a notable effect on the microcapsule dimensions. TABLE 1 presents the mean diameter of the microcapsules for different combinations of processing parameters; FIG. 9, Panels A-I show the corresponding digital photographs of the obtained microcapsules. Cross-sectional confocal images are shown in FIG. 9, Panels J-R. In all cases, an optimized collection procedure has been used as described in Section 2.2.1 involving initial continuous shaking of the droplets in the asphaltenes bed for about 2 h to enable formation of a conformal layer followed by intermittent shaking for about 22 h. A clear correlation is observed between the microcapsule dimensions and the nozzle diameter. A 450 µm nozzle yields relatively smaller diameter microcapsules as compared to a 750 µm nozzle, reflecting the smaller size of the jetted bitumen droplets. For a fixed nozzle size and temperature, the microcapsule diameter decreases with an increase in the flow rate. At high flow rates, for instance, beyond flow rates of about 12 mL/min at about 105° C. and about 115° C. for a 750 µm nozzle, considerable sputtering of the bitumen flow stream is observed, and the obtained microcapsules are highly polydispersed in terms of their dimensions. When the flow rate and nozzle size were kept constant, an increase in the temperature of bitumen (through increase in the temperature of the syringe, connecting metal pipe, and the nozzle system) led to smaller sized microcapsules. For a 450 µm nozzle at a bitumen flow rate of about 8 mL/min, the microcapsules decreased in size from 1.91±0.36 mm to 1.66±0.23 mm as the temperature of bitumen increases from about 105° C. to about 115° C. The microcapsule diameter was found to be the largest, about 2.36±0.36 mm, when using a 750 µm nozzle at about 105° C. at a bitumen flow rate of 6 mL/min flow rate, and the lowest, 1.66±0.23 mm, when using a 450 µm nozzle at about 115° C. and about 8 mL/min flow rate. The cross-sectional images enable the bitumen core and asphaltenes shells to be distinguished. The shell thicknesses under different conditions are further listed in Table 1.

TABLE 1

Dimensions of microcapsules obtained for different processing parameters.

| Nozzle Size | Sample ID* | Temperature of bitumen (° C.) | Flow rate (mL/min) | Mean diameter (mm)[1] | Shell thickness (µm) | Mass % asphaltenes (determined gravimetrically) | Mass % asphaltenes (from image analysis)[2] |
|---|---|---|---|---|---|---|---|
| 750 µm | A | 95 | 8 | 1.81 ± 0.24 | 200 ± 3.0 | 42.7 | 42.5 |
| | B | 105 | 6 | 2.36 ± 0.36 | 220 ± 8.0 | 35.9 | 36.2 |
| | C | 105 | 8 | 2.05 ± 0.35 | 200 ± 6.0 | 37.8 | 37.8 |
| | D | 105 | 12 | 1.87 ± 0.27 | 210 ± 6.0 | 39.5 | 43.1 |
| | E | 115 | 12 | 1.67 ± 0.21 | 180 ± 6.0 | 45.8 | 42.6 |
| 450 µm | F | 105 | 6 | 1.93 ± 0.29 | 220 ± 8.0 | 38.5 | 43.7 |
| | G | 105 | 8 | 1.91 ± 0.36 | 220 ± 6.0 | 38.6 | 44.2 |
| | H | 105 | 12 | 1.82 ± 0.26 | 200 ± 4.0 | 42.7 | 42.3 |
| | I | 115 | 8 | 1.66 ± 0.23 | 180 ± 4.0 | 46.0 | 41.7 |

*Corresponds to label in FIG. 9.
[1]Determined based on measurements of 70-100 microcapsules.
[2]Assumes a density of asphaltenes of about 0.67 g/mL.

The relative mass percentages of asphaltenes and bitumen for differently sized microcapsules have been determined by two different methods. The first gravimetric approach involves measuring the difference in the mass of asphaltenes before and after removal of the microcapsule shells. The mass of bitumen is determined by weighing the trough before and after dispersion from the nozzle. The assessments of mass percentages are based on ensembles of between about 2,000 and about 5,000 microcapsules.

The second approach involves distinguishing the diameters of the bitumen core ($2r_{core}$) and the thicknesses of the asphaltenes shells ($2r_{microcapsule} - 2r_{core}$) based on cross-sectional confocal microscopy and determining the mass percentages based on the densities of the two components measured as per the methods described above. FIG. 9, Panels J-R and exhibit confocal cross-sectional images of typical microcapsules. Density values of bitumen ($\rho_b$) and asphaltenes powders ($\rho_a$) are measured to be about 1.01±0.01 g/mL and about 0.67±0.02 g/mL, respectively, whereas the reported average grain density of compacted asphaltenes is about 1.17 g/mL. Based on the difference between the measured density and the density reported in the literature for asphaltenes, the porosity of the asphaltenes shell is deduced to be about 42.2%. The following expression is used to determine the mass ratios of asphaltenes to bitumen ($m_a$ and $m_b$).

$$\frac{m_a}{m_b} = \frac{(r^3_{microcapsule} - r^3_{core})\rho_a}{r^3_{core}\rho_b}$$

The mass percentage of the two components calculated by these two alternative approaches are generally found to be in good agreement within about ±13.5% (TABLE 1). In general, that the proportion of the microcapsule constituted from asphaltenes were found to increase with decreasing diameter of the microcapsules (FIG. 9, Panels J-R, and TABLE 1). For instance, microcapsules with a diameter of about 1.81±0.24 mm have ca. 0.20±0.03 mm shells and the asphaltenes mass fraction is estimated to be about 42%. In contrast, microcapsules with a diameter of about 1.67±0.21 mm have about 0.18±0.06 mm shells and the asphaltenes mass fraction is estimated to be about 46%.

Figure 10:
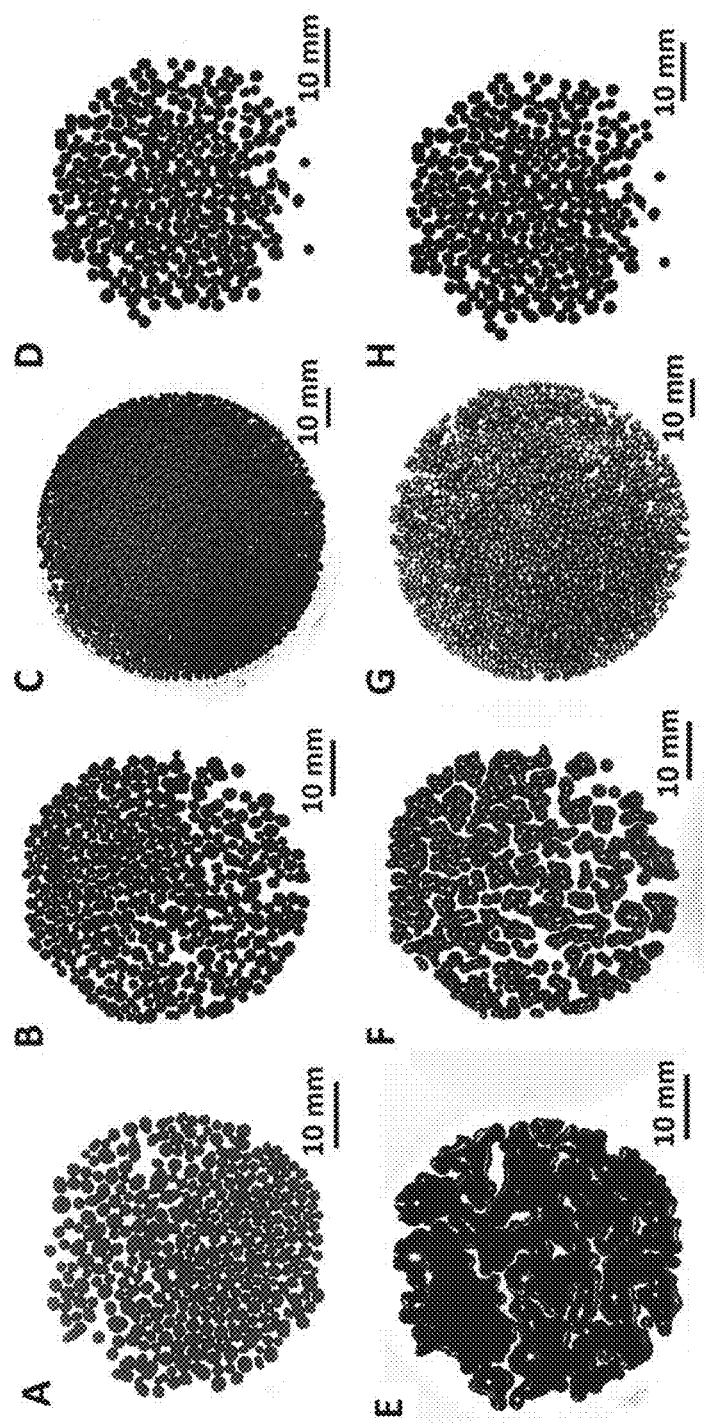
FIG. 10 shows: (i) digital photographs of asphaltene-coated bitumen microcapsules prepared in accordance with the present disclosure after agitation for about 1 h, about 6.5 h, about 19 h, and about 24 h, respectively (Panels A-D); and (ii) digital photographs of the microcapsules shown in Panels A-D after being undisturbed for about 12 h (Panels E, F, G, and H correlate with Panels A, B, C, and D, respectively).

In the present example, the bitumen droplets dispersed from the nozzle are encapsulated with asphaltenes using a powder bed that is agitated at specific intervals. During the initial agitation period, the asphaltenes form a conformal coating on the bitumen droplets. Within this period, the temperature of the bitumen droplets is high and heat transfer to the asphaltenes favors their crosslinking as demonstrated with reference to FIG. 7. FIG. 10, Panels A-H depict asphaltene-coated bitumen microcapsules, wherein the bitumen droplets were dispersed from a 750 μm nozzle at a flow rate of about 8 mL/h and delivery system temperature of about 95° C. In FIG. 10, the asphaltene-coated bitumen microcapsules depicted in Panels A-H differ in terms of the period of agitation and rest. In FIG. 10, the digital photographs in Panels A-D were captured immediately after agitation periods of about 1 h, about 6.5 h, about 19 h, and about 24 h, respectively. In FIG. 10, the digital photographs in Panels E-H were captured after being left undisturbed for about 12 h following agitation periods of about 1 h, about 6.5 h, about 19 h, and about 24 h, respectively. The microcapsules agitated for about 1 h and about 6.5 h (FIG. 10, Panels A and B) disintegrate upon being left undisturbed for about 12 h releasing their bitumen payloads as shown Panels E and F. Accordingly, in the present example, extended agitation in the bed of asphaltenes appears to facilitate the development of a conformal and crosslinked shell. In the present example, microcapsules agitated about for 19 h (FIG. 10, Panel C) maintain their integrity but the microcapsules stick to each other when left undisturbed for about 12 h (FIG. 10, Panel C). As such, it appears that agitation for longer periods is required to coat the exposed bitumen with asphaltenes under the conditions of the present example. A period of about 24 h may be suitable for obtaining conformal asphaltenes shells that can hold their shape and retain sufficient stress-withstanding abilities in accordance with the present disclosure.

In the present example, for a given temperature of bitumen (e.g., about 95° C.), the temperature of the collection bed was varied to examine its influence on microcapsule formation and the strength of the resulting microcapsules. When the collection bed of asphaltenes was cooled to about 0° C., the agitation period to obtain stable microcapsules was determined to increase to 29 h, which supports the temperature-activated nature of the crosslinking process that gives the shells strength. The obtained microcapsules were furthermore much weaker in terms of their stress-withstanding abilities as compared to microcapsules collected from the about 23° C. powder bed. When the collection bed temperature was about 75° C., the resulting microcapsules formed stable shells within about 24 h. However, the rapidly crosslinked shells became brittle after 21 days. Considering this behavior, under the present conditions, about 23° C. offers a suitable temperature for the bed of asphaltenes, enabling initiation of crosslinking as a result of local heating from the hot bitumen droplets.

Figure 11:
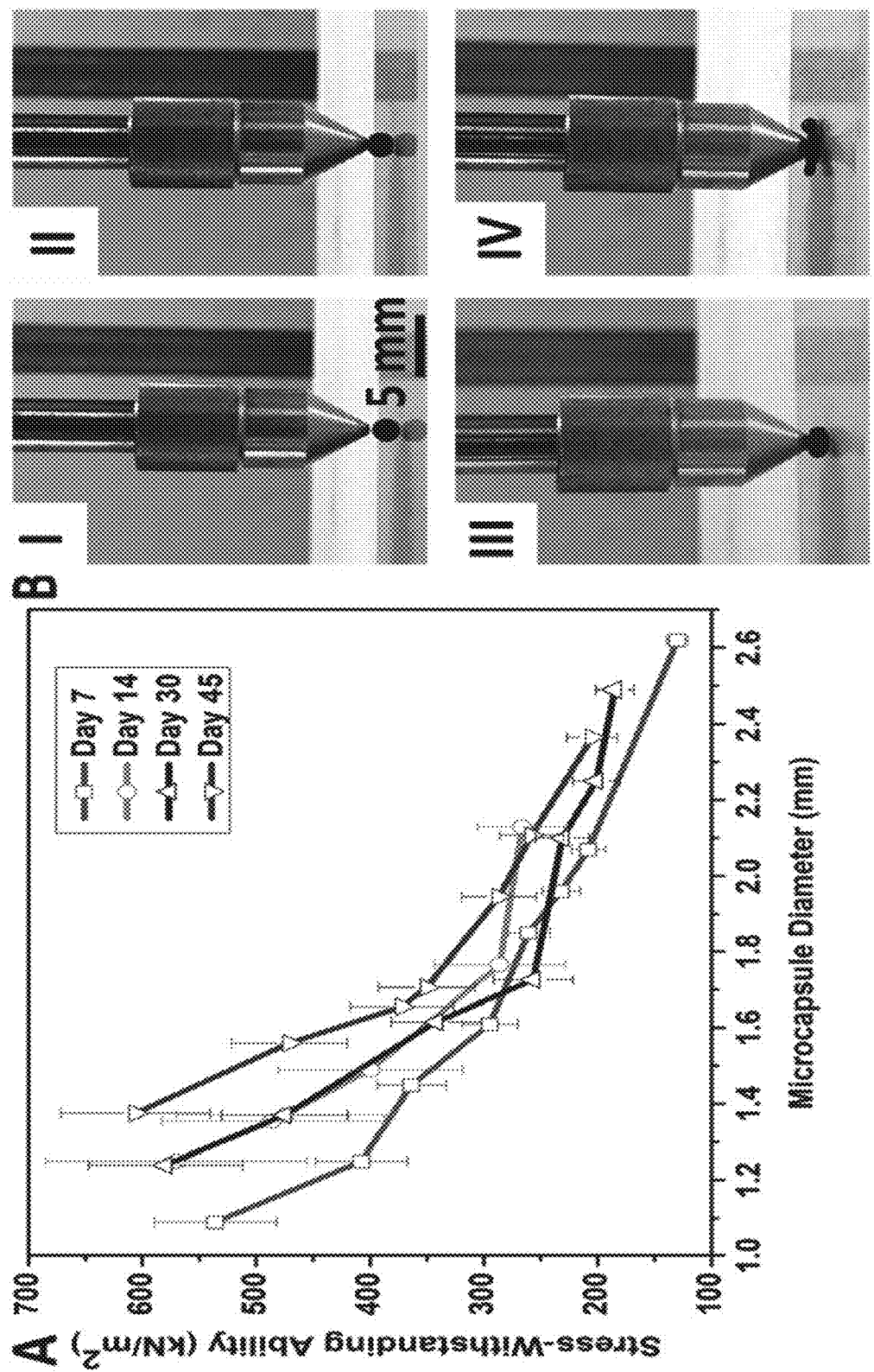
FIG. 11 shows: (i) stress-withstanding abilities of asphaltene-coated bitumen microcapsules prepared in accordance with the present disclosure as a function of their diameter (Panel A); and (ii) time-lapse digital photographs of the rupture of an asphaltene-coated bitumen microcapsule prepared in accordance with the present disclosure under application of force by a force transducer.

In the present example, the stress-withstanding abilities of the microcapsules was examined using static deformation and velocity impact measurements. FIG. 11, Panel A plots the stress-withstanding abilities of microcapsules prepared using bitumen at about 95° C. and asphaltenes at about 23° C. FIG. 11, Panel B shows the typical rupturing of a microcapsule upon application of an external stress by a force transducer. The microcapsule first deforms and subsequently ruptures which leads to bitumen leakage. The stress-withstanding ability is seen to be inversely proportional to the microcapsule size. Since smaller microcapsules have a greater proportion of the shell material (TABLE 1 and FIG. 9, Panels J-R) and a smaller deformable liquid core, the stress-withstanding ability of the microcapsules increase with a decrease in the size. For instance, for microcapsules having diameters of about 2 μm, the stress-withstanding ability was determined to be about 210 kN/m² after a period of about 3 days, whereas it increased to about 533 kN/m² for an about 1.09 μm microcapsule (FIG. 11, Panel A).

Without being bound to any particular theory, it appears that with increasing time, the asphaltenes adopt conformations that allow for increased intermolecular interactions such as π-π stacking, and hydrogen bonding, promoting further rigidification of the shell. FIG. 11, Panel A shows that the stress-withstanding ability of the microcapsules increased by about 15% to about 60% with an increase in time up to about 45 days reflecting the activated kinetics of ordered aggregation of asphaltenes. In contrast, microcapsules collected when the temperature of the asphaltenes bed was about 75° C. exhibited minimal variations in their stress-withstanding abilities with time.

Figure 12:
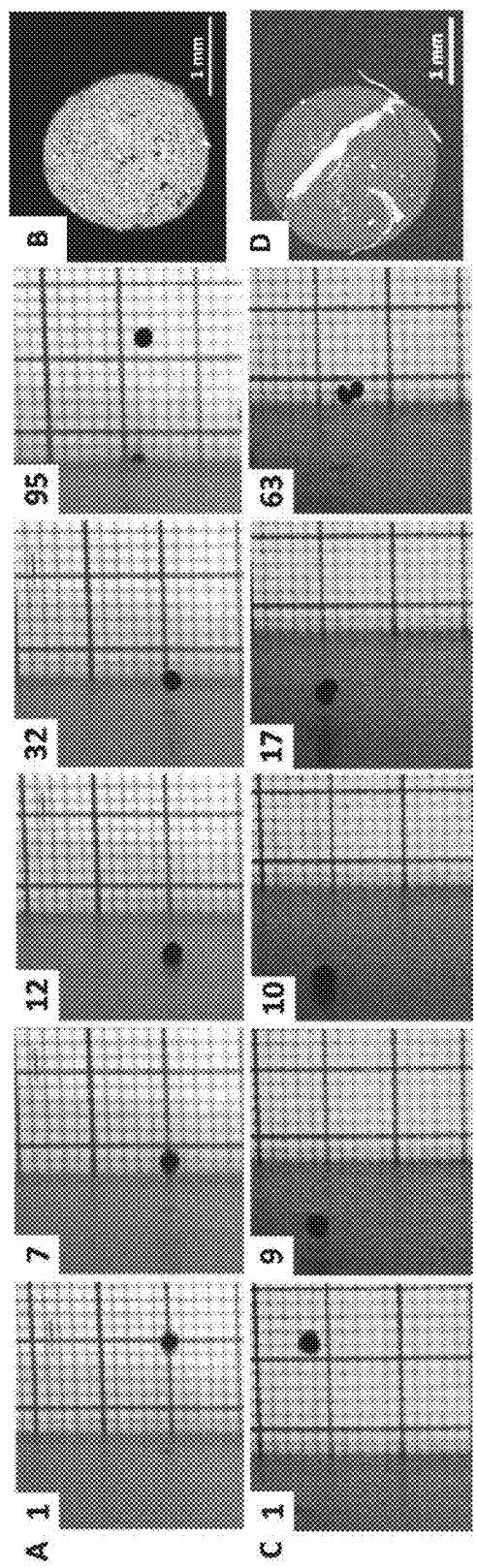
FIG. 12 shows: (i) still images from a video of asphaltene-coated bitumen microcapsules prepared in accordance with the present disclosure hitting an aluminum surface hitting during velocity impact testing (Panels A and C); and (ii) confocal images of the microcapsules after the velocity impact testing (Panel B and D).

With respect to velocity impact testing, FIG. 12, Panel A shows a series of high-speed time-lapse images depicting the impact of a microcapsule on an aluminum substrate at a velocity of about 23.3 m/s. The images capture the capsule as it ricochet back upon impact and the corresponding confocal image (FIG. 12, Panel B) indicates preservation of microcapsule without discernible crack formation. In contrast, FIG. 12, Panel C shows that at a velocity of about 32.0 m/s, the microcapsule was compromised by the impact. The associated confocal image of the recovered microcapsule shown in FIG. 12, Panel D indicates a pronounced crack spanning almost the entire diameter of the capsule with a thickness of about 210 μm, along with a set of distributed cracks emanating from the primary crack. More generally, under the conditions evaluated in the present example, the safe impact velocity on aluminum surfaces was determined to be greater than or equal to about 31.8 m/s, whereas for cardboard, it was determined to be greater than or equal to about 37.3 m/s. These safe velocities suggest that the microcapsules can withstand velocity impacts from free fall on aluminum and cardboard at heights of about 51.6 m and about 1.0 m, respectively. In contrast, the safe velocities microcapsules prepared from asphaltenes at about 75° C. and bitumen at about 105° C. on aluminum and cardboard were found to be greater than or equal to about 33.9 m/s and about 36.3 m/s, respectively.

In the present disclosure, all terms referred to in singular form are meant to encompass plural forms of the same. Likewise, all terms referred to in plural form are meant to encompass singular forms of the same. Unless defined otherwise, all technical and scientific terms used herein have the same meaning as commonly understood by one of ordinary skill in the art to which this disclosure pertains.

As used herein, the term "about" refers to an approximately +/−10% variation from a given value. It is to be understood that such a variation is always included in any given value provided herein, whether or not it is specifically referred to.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Although individual embodiments are discussed, the disclosure covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure. If there is any conflict in the usages of a word or term in this specification and one or more patent(s) or other documents that may be referenced or incorporated herein by reference, the definitions that are consistent with this specification should be adopted.

Many obvious variations of the embodiments set out herein will suggest themselves to those skilled in the art in light of the present disclosure. Such obvious variations are within the full intended scope of the appended claims.

The invention claimed is:

1. An asphaltene-coated bitumen microcapsule, comprising:
   a microcapsule core comprising bitumen, deasphalted oil, or a combination thereof; and a microcapsule shell comprising asphaltenes;
   wherein the microcapsule core and the microcapsule shell are substantially derived from the same origin, and wherein the asphaltenes, the bitumen, the deasphalted oil, or the combination thereof is cured by aging under a set of conditions, such that the asphaltene-coated bitumen microcapsule is sufficiently mechanically resilient to surpass a threshold for transportation; and
   wherein the threshold for transportation is defined as a velocity-impact resiliency of at least about 10 m/s and/or a compression-stress resiliency of at least about 50 kN/m$^2$.

2. The asphaltene-coated bitumen microcapsule of claim 1, wherein:
   the microcapsule core has a microcapsule-core radius ($r_{core}$) of between about 100 µm and about 1,500 µm; and/or
   the microcapsule shell has a microcapsule-shell radius ($t_{shell}$) of between about 10 µm and about 300 µm.

3. The asphaltene-coated bitumen microcapsule of claim 1, which has:
   a core-shell ratio ($r_{core}:t_{shell}$) of between about 4.0:1.0 and about 1.0:1.0;
   a core-microcapsule ratio ($r_{core}:r_{microcapsule}$) of between about 1.0:2.0 and about 1.0:1.1:
   a shell-microcapsule ratio ($t_{shell}:r_{microcapsule}$) of between about 1.0:10.0 and about 1.0:2.0: and/or
   a weight ratio ($m_a/m_b$) of between about 1.0:1.0 and about 1.0:2.2, wherein $m_a$ is the mass of the asphaltenes and $m_b$ is the mass of the bitumen, the deasphalted oil, or the combination thereof.

4. The asphaltene-coated bitumen microcapsule of claim 1, wherein at least a portion of the asphaltenes are:
   derived from treatment of whole bitumen with a $C_5$-$C_7$ hydrocarbon solvent;
   substantially insoluble in toluene; and/or
   at least partially soluble in a solvent having solubility parameters of between about 17 MPa$^{1/2}$ and about 19 MPa$^{1/2}$.

5. The asphaltene-coated bitumen microcapsule of claim 1, wherein at least a portion of the bitumen, the deasphalted oil, or the combination thereof are substantially soluble in a $C_5$-$C_7$ hydrocarbon solvent.

6. The asphaltene-coated bitumen microcapsule of claim 1, wherein the microcapsule core has a microcapsule-core radius ($r_{core}$) of between about 100 µm and about 1,500 µm.

7. The asphaltene-coated bitumen microcapsule of claim 1, wherein the microcapsule shell has a microcapsule-shell radius ($t_{shell}$) of between about 10 µm and about 300 µm.

8. The asphaltene-coated bitumen microcapsule of claim 1, which has a core-shell ratio ($r_{core}:t_{shell}$) of between about 4.0:1.0 and about 1.0:1.0.

9. The asphaltene-coated bitumen microcapsule of claim 1, which has a core-microcapsule ratio ($r_{core}:r_{microcapsule}$) between about 1.0:2.0 and about 1.0:1.1.

10. The asphaltene-coated bitumen microcapsule of claim 1, which has a shell-microcapsule ratio ($t_{shell}:r_{microcapsule}$) of between about 1.0:10.0 and about 1.0:2.0.

11. The asphaltene-coated bitumen microcapsule of claim 1, which has a weight ratio ($m_a/m_b$) of between about 1.0:1.0 and about 1.0:2.2, wherein $m_a$ is the mass of the asphaltenes and $m_b$ is the mass of the bitumen, the deasphalted oil, or the combination thereof.

12. The asphaltene-coated bitumen microcapsule of claim 1, wherein the curing by the aging comprises cooling in the presence of water, alcohol, a surfactant, or a combination thereof.

13. The asphaltene-coated bitumen microcapsule of claim 1, wherein the curing by the aging is in the presence of air, an inert gas, or a combination thereof.

\* \* \* \* \*